(12) United States Patent
Iriuchijima et al.

(10) Patent No.: US 6,311,094 B1
(45) Date of Patent: *Oct. 30, 2001

(54) PRODUCTION PLANNING METHOD, A STORAGE MEDIUM AND A PRODUCTION PLANNING APPARATUS

(75) Inventors: Ken Iriuchijima, Yokohama; Hideo Sakamoto, Kanagawa-ken; Mutsumi Fujihara, Yokohama, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,269

(22) Filed: Aug. 25, 1998

(30) Foreign Application Priority Data

Sep. 16, 1997 (JP) .................................................. 9-250674

(51) Int. Cl.[7] .................................................... G06F 19/00
(52) U.S. Cl. .............................................. 700/100; 700/95
(58) Field of Search ....................................... 700/101, 102, 700/100, 99, 97, 95, 96, 111, 108

(56) References Cited

U.S. PATENT DOCUMENTS

| | | | |
|---|---|---|---|
| 5,402,350 | * | 3/1995 | Kline ..................... 700/101 |
| 5,748,478 | * | 5/1998 | Pan et al. ................. 700/99 |
| 5,825,650 | * | 10/1998 | Wang ..................... 700/100 |
| 5,826,238 | * | 10/1998 | Chen et al. ................ 705/8 |
| 5,880,960 | * | 3/1999 | Lin et al. ................. 700/99 |
| 5,889,673 | * | 3/1999 | Pan et al. ................. 700/97 |
| 5,950,170 | * | 9/1999 | Pan et al. ................. 705/7 |
| 5,971,584 | * | 10/1999 | Iriuchijima et al. ......... 700/101 |

FOREIGN PATENT DOCUMENTS

| | | |
|---|---|---|
| 6-328351 | 11/1994 | (JP) . |
| 8-252749 | 10/1996 | (JP) . |

* cited by examiner

Primary Examiner—William Grant
Assistant Examiner—Edward F. Gain, Jr.
(74) Attorney, Agent, or Firm—Banner & Witcoff, Ltd.

(57) ABSTRACT

A production plan is made for a production line for producing finished products from a raw material. Based on the stock number of works in respective process steps at a planning time, the number of works processed at the respective process steps up to the planning time is calculated as the current cumulated processed works of the respective process steps. The target of the stock number of works in the respective process steps at a planned time following a passage of a plan period is calculated based on a target production representing the number of finished products outputted up to the planned time and an average cycle time of production from the raw material to finished products. The target cumulated processed works of the respective process steps at the planned time is calculated based on the target of the stock number of works in the respective process steps. The number of works necessary to be processed in the respective process steps during a period from a planning time to a planned time is calculated, as a process step load of the respective process steps, based on the current cumulated processed works of the respective process steps at the planning time and the target of the total number of the respective process steps at the planned time.

4 Claims, 26 Drawing Sheets

PRODUCT a(1)

| PROCESS STEP NAME (ORDER OF PROCESSING) | INPUT 1 | P1 | P2 | P3 | P4 | OUTPUT 1 |
|---|---|---|---|---|---|---|
| CURRENT NUMBER OF WORKS | 0 | 120 | 70 | 180 | 50 | 90 |

FIG. 4A

PRODUCT a(2)

| PROCESS STEP NAME (ORDER OF PROCESSING) | INPUT 2 | Q1 | Q2 | Q3 | OUTPUT 2 |
|---|---|---|---|---|---|
| CURRENT NUMBER OF WORKS | 0 | 40 | 60 | 30 | 20 |

FIG. 4B

| PRODUCT | PROCESS FLOW | | | | | |
|---|---|---|---|---|---|---|
| a(1) | INPUT 1 | P1 | P2 | P3 | P4 | OUTPUT 1 |
| a(2) | INPUT 2 | Q1 | Q2 | Q3 | OUTPUT 2 | |

PROCESS FLOW

FIG. 5

| PRODUCT | CURRENT MONTH (0) | NEXT MONTH (1) | 2 | 3 |
|---|---|---|---|---|
| a(1) | 300 | 300 | 400 | 500 |
| a(2) | 250 | 200 | 150 | 100 |

TARGET PRODUCTION

| PRODUCT | THEORETICAL CYCLE TIME (MONTH) | TARGET SPECIFIC CYCLE TIME |
|---|---|---|
| a(1) | 0.5 | 3 |
| a(2) | 0.8 | 2.5 |

CONSTANT DATA

FIG. 8

| PROCESS STEP NAME | P1 | P2 | P3 | P4 | OUTPUT 1 | Q1 | Q2 | Q3 | OUTPUT 2 |
|---|---|---|---|---|---|---|---|---|---|
| PARTICIPATING EQUIPMENT | M1 | M2 | M1 | M2 | M3 | M1 | M2 | M2 | M3 |

PROCESS STEP/EQUIPMENT TABLE

FIG. 9

| PROCESS STEP NAME | INPUT 1 | P1 | P2 | P3 | P4 | OUTPUT 1 | INPUT 2 | Q1 | Q2 | Q3 | OUTPUT 2 |
|---|---|---|---|---|---|---|---|---|---|---|---|
| LOAD | 290 | 310 | 280 | 360 | 310 | 300 | 450 | 402 | 374 | 317 | 250 |

PROCESS STEP LOAD OF CURRENT MONTH

FIG. 10

| EQUIPMENT NAME | M1 | M2 | M3 |
|---|---|---|---|
| LOAD | 1072 | 1281 | 550 |

EQUIPMENT LOAD OF CURRENT MONTH

FIG. 12

CURRENT CUMULATED PROCESSED WORKS

| PROCESS STEP | INPUT 1 | P1 | P2 | P3 | P4 | OUTPUT 1 | INPUT 2 | Q1 | Q2 | Q3 | OUTPUT 2 |
|---|---|---|---|---|---|---|---|---|---|---|---|
| CURRENT CUMULATED PROCESSED WORKS | 510 | 390 | 320 | 140 | 90 | 0 | 150 | 110 | 50 | 20 | 0 |

FIG. 13

| LOOP VARIABLE | i | 5 | 4 | 3 | 2 | 1 | 0 |
|---|---|---|---|---|---|---|---|
| CURRENT NUMBER OF WORKS | w0(1,i) | 90 | 50 | 180 | 70 | 120 | 0 |
| PROCESS STEP VARIABLE (LOOP ENTRY TIME) | p | 0 | 90 | 140 | 320 | 390 | 510 |
| CURRENT CUMULATED PROCESSED WORKS | p0(1,i) | 0 | 90 | 140 | 320 | 390 | 510 |

FIG. 15A b=1

| LOOP VARIABLE | i | 5 | 4 | 3 | 2 |
|---|---|---|---|---|---|
| PROCESS STEP VARIABLE (LOOP ENTRY TIME) | W | 500 | 400 | 300 | 200 |
| TARGET NUMBER OF WORKS | w1(1,i) | 100 | 100 | 100 | 100 |

FIG. 15B b=2

| LOOP VARIABLE | i | 4 | 3 | 2 |
|---|---|---|---|---|
| PROCESS STEP VARIABLE (LOOP ENTRY TIME) | W | 350 | 263 | 176 |
| TARGET NUMBER OF WORKS | w1(2,i) | 87 | 87 | 88 |

TARGET WORK ALLOCATION

| PROCESS STEP | INPUT 1 | P1 | P2 | P3 | P4 | OUTPUT 1 | INPUT 2 | Q1 | Q2 | Q3 | OUTPUT 2 |
|---|---|---|---|---|---|---|---|---|---|---|---|
| TARGET NUMBER OF WORKS | 0 | 100 | 100 | 100 | 100 | 100 | 0 | 88 | 88 | 87 | 87 |

| LOOP VARIABLE | i | 5 | 4 | 3 | 2 | 1 | 0 |
|---|---|---|---|---|---|---|---|
| TARGET NUMBER OF WORKS | w1(1, i) | 100 | 100 | 100 | 100 | 100 | 0 |
| PROCESS TASK (LOOP ENTRY TIME) | p | 300 | 400 | 500 | 600 | 700 | 800 |
| TARGET CUMULATED PROCESSED WORKS | p1(1, i) | 300 | 400 | 500 | 600 | 700 | 800 |

FIG. 19

| PROCESS STEP NAME | INPUT 1 | P1 | P2 | P3 | P4 | OUTPUT 1 | INPUT 2 | Q1 | Q2 | Q3 | OUTPUT 2 |
|---|---|---|---|---|---|---|---|---|---|---|---|
| TARGET CUMULATED PROCESSED WORKS | 800 | 700 | 600 | 500 | 400 | 300 | 600 | 512 | 424 | 337 | 250 |

| LOOP VARIABLE | i | 0 | 1 | 2 | 3 | 4 | 5 |
|---|---|---|---|---|---|---|---|
| CURRENT CUMULATED PROCESSED WORKS | p0(1, i) | 510 | 390 | 320 | 140 | 90 | 0 |
| TARGET CUMULATED PROCESSED WORKS | p1(1, i) | 800 | 700 | 600 | 500 | 400 | 300 |
| PROCESS STEP LOAD | lo(1, i) | 290 | 310 | 280 | 360 | 310 | 300 |

| LOOP VARIABLE | i | 1 | 2 | 3 | 4 | 5 |
|---|---|---|---|---|---|---|
| PARTICIPATING EQUIPMENT | m(i) | M1 | M2 | M1 | M2 | M3 |
| PROCESS STEP VARIABLE (AT A TIME OF PROCESSING STEP S80) | k | 1 | 2 | 1 | 2 | 3 |
| EQUIPMENT LOAD (AT A LOOP LEAVING TIME) | l1(k) | 310 | 280 | 670 | 590 | 300 |

FIG. 23B b=2

| LOOP VARIABLE | i | 1 | 2 | 3 | 4 |
|---|---|---|---|---|---|
| PARTICIPATING EQUIPMENT | m(i) | M1 | M2 | M2 | M3 |
| PROCESS STEP VARIABLE (AT A TIME OF PROCESSING STEP S80) | k | 1 | 2 | 2 | 3 |
| EQUIPMENT LOAD (AT A LOOP LEAVING TIME) | l1(k) | 1072 | 964 | 1281 | 550 |

| EQUIPMENT NAME | M1 | M2 | M3 |
|---|---|---|---|
| PROCESSING CAPABILITY | 1000 | 1300 | 500 |

PROCESSING CAPABILITY OF EACH EQUIPMENT

FIG. 25

| EXCESS LOAD EQUIPMENT | EXCESS PERCENTAGE (%) | EXCESS QUANTITY |
|---|---|---|
| M3 | 10.0 | 50 |
| M1 | 7.2 | 72 |

LIST OF EXCESS LOAD EQUIPMENT

FIG. 26

| LOOP VARIABLE | k | 1 | 2 | 3 |
|---|---|---|---|---|
| PARTICIPATING EQUIPMENT | M(k) | M1 | M2 | M3 |
| PROCESSING CAPABILITY | p(k) | 1000 | 1300 | 500 |
| LOAD | l1(k) | 1072 | 1281 | 550 |
| PRESENCE/ABSENCE OF EXCESS LOAD (STEP S94) | | yes | no | yes |
| PROCESS STEP VARIABLE | | 1 | — | 2 |
| ELEMENT OF PROCESS STEP ARRAY (I,j) (j=0,1,2) | | (1.072, 72, M1) | — | (1, 1, 50, M3) |

FIG. 28

PRODUCTION POLICY

| PRODUCT | POLICY |
|---|---|
| a(1) | OUTPUT PREFERENCE |
| a(2) | STEP REMAINING ITEM PREFERENCE |

FIG. 30

PROCESS STEP LOAD AFTER REDUCTION

| | PRODUCT a(1) | | | | | | PRODUCT a(2) | | | | |
|---|---|---|---|---|---|---|---|---|---|---|---|
| 12(b, i) | 262 | 284 | 280 | 340 | 310 | 287 | 428 | 376 | 374 | 317 | 213 |

INITIAL STATE

| | PRODUCT a(1) | | | | | PRODUCT a(2) | | | | | | EQUIPMENT | |
|---|---|---|---|---|---|---|---|---|---|---|---|---|---|
| p1(b,i) | 800 | 700 | 600 | 500 | 400 | 300 | | 600 | 512 | 424 | 337 | 250 | q(k) | 107.2 98.5 110.0 |
| p2(b,i) | 800 | 700 | 600 | 500 | 400 | 300 | | 600 | 512 | 424 | 337 | 250 | | |
| pt(b,i) | 800 | 700 | 600 | 500 | 400 | 300 | | 600 | 512 | 424 | 337 | 250 | | |
| Δp(b,i) | 0 | 0 | 0 | 0 | 0 | 0 | | 0 | 0 | 0 | 0 | 0 | | |
| r(b) | 0.0 | | | | | | | 0.0 | | | | | | |

FIG. 37B

UPDATE 83 TIMES

| | PRODUCT a(1) | | | | | | PRODUCT a(2) | | | | | | EQUIPMENT | |
|---|---|---|---|---|---|---|---|---|---|---|---|---|---|---|
| p1(b,i) | 800 | 700 | 600 | 500 | 400 | 300 | | 600 | 512 | 424 | 337 | 250 | q(k) | 103.4 98.5 103.4 |
| p2(b,i) | 788 | 688 | 588 | 488 | 388 | 288 | | 589 | 499 | 409 | 319 | 229 | | |
| pt(b,i) | 788 | 688 | 600 | 488 | 400 | 288 | | 589 | 498 | 424 | 337 | 229 | | |
| Δp(b,i) | 0 | 0 | 12 | 0 | 12 | 0 | | 0 | −1 | 15 | 18 | 0 | | |
| r(b) | −2.59 | | | | | | | −2.57 | | | | | | |

FIG. 37C

FINAL STATE (AFTER UPDATE 150 TIMES)

| | PRODUCT a(1) | | | | | | PRODUCT a(2) | | | | | | EQUIPMENT | |
|---|---|---|---|---|---|---|---|---|---|---|---|---|---|---|
| p1(b,i) | 800 | 700 | 600 | 500 | 400 | 300 | | 600 | 512 | 424 | 337 | 250 | q(k) | 100.0 98.5 100.0 |
| p2(b,i) | 772 | 675 | 578 | 481 | 384 | 287 | | 578 | 487 | 396 | 304 | 213 | | |
| pt(b,i) | 772 | 674 | 600 | 480 | 400 | 287 | | 578 | 486 | 424 | 337 | 213 | | |
| Δp(b,i) | 0 | −1 | 22 | −1 | 16 | 0 | | 0 | −0.8 | 28.5 | 32.8 | 0 | | |
| r(b) | −4.70 | | | | | | | −4.74 | | | | | | |

PRODUCTION PLANNING METHOD, A STORAGE MEDIUM AND A PRODUCTION PLANNING APPARATUS

BACKGROUND OF THE INVENTION

The present invention relates to a production planning method for planning the production of products, such as semiconductor devices, requiring a relatively longer cycle time of production and advance processing based on a predictive demand, a storage medium and a production planning apparatus.

Many techniques have been known for managing the production process.

For example, JPN PAT APPLN KOKAI PUBLICATION Nos. 64-34644 and 6-328351 have proposed the technique for controlling the quantity of production of finished products at a ratio of productions among the kinds of items.

JPN PAT APPLN KOKAI PUBLICATION No. 3-14675 has proposed an in-process vehicle management method for grasping the number of stocks (vehicles) in the process on a per-specification basis and controlling a total quantity of works per kind.

Further, "An adjustment Method for Balanced Production Scheduling Problem" in "Proceedings of Production Scheduling Symposium '95" (Oct. 2, 1995 Kyoto)—pp 187 to 192—has proposed The Institute of System's Control & Information Engineers discloses the technique of balancing a daily quantity of processing in respective processes.

JPN PAT APPLN KOKAI PUBLICATION No. 8-252749 discloses a balancing system in production planning, that is, a production planning system for, as a basic policy, balancing a quantity of production in unit interval.

As set out above, a planning system is known for, as a goal, balancing a quantity of processing or a quantity of production in unit cycle time in production planning, that is, inputting a target production in planning cycle time and a work allocation at a planned time and finding a quantity of processing required in the planning cycle time. Further, also known is a method for controlling a total quantity of works on a per-kind basis.

In the conventional method, when the number of loads in the respective equipment derived from the target production, that is, the number of works to be processed up to a delivery in respective equipment, exceeds the processing capability, then the exceeded load quantity is reduced by a stacking/leveling method. However, this method can simply draw up a micro-production plan in lot units.

For a product, such as a semiconductor device, involving an ever decreasing tendency in the cycle time of processing from the ordering to the delivery, an advance production is carried out, prior to the actual ordering, based on a predictive demand. For such a micro-production planning in lot units, however, the production adjustment cannot be achieved smoothly.

BRIEF SUMMARY OF THE INVENTION

It is accordingly the object of the present invention to provide a production planning method capable of flexibly coping with a variation in an quantity of production, while suppressing works to a necessary-minimal extent, a storage medium and a production planning apparatus.

The present invention is applied to the production planning of a production line from a raw material to finished products. The production process for producing the finished product from the raw material is divided into a plurality of process steps. A plurality of equipments are arranged in the production line. At least one of these equipments participates in at least two of these process steps. First, based on the stock number of works at a time of the production planning, the number of works processed up to the production planning is calculated as a cumulated processed works achieved at respective processes. The target corresponding to the stock number of works in the respective process steps at the production planned time following the planning period is calculated based on the target production representing the number of finished products outputted up to the planned time and an average period from the raw material to the finished product. And the target corresponding to the total number of process steps at the planned time is calculated based on the target corresponding to the stock number of works in the respective process steps. The number of works necessary to be subjected to process steps during a period from the planning time to the planned time is calculated, as process step loads, based on the current cumulated processed works achieved during a period from the planning time to the planned time. Since the load is individually calculated relative to the respective process steps, it is possible to draw up the production plan in a macro-viewpoint and hence to flexibly cope with a variation in a production quantity while suppressing the works to a necessary minimal extent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a view showing one form of a current work allocation data on a finished product a(1);

FIG. 4B is a view showing one form of a current work allocation data on a finished product a(2);

FIG. 5 is a view showing one form of a process flow data;

FIG. 6 is a view showing one form of target production data;

FIG. 7 is one form of data on a theoretical cycle time of production and on a target specific cycle time of production;

FIG. 8 shows one form of a process step/equipment table;

FIG. 9 shows one form of a process step load outputted from a load calculation section in FIG. 2;

FIG. 10 shows one form of an equipment load outputted from the load calculation section in FIG. 2;

FIG. 12 shows one form of the current cumulated processed works of respective process steps calculated at the load calculation section of FIG. 2;

FIG. 13 shows one form of the current cumulated processed works of the respective process steps;

FIG. 15A shows one form of a target number of works relating to a finished product a(1) of a finished product code b=1 in the flow chart of FIG. 14;

FIG. 15B shows one form of a target number of works relating to a finished product a(2) of a finished product code b=2 in the flow chart of FIG. 14;

FIG. 16 is a view showing one form of a target work allocation calculated by the load calculation section of FIG. 2;

FIG. 18 is one form of the target cumulated processed works in the flowchart of FIG. 17;

FIG. 19 is a view showing one form of the target cumulated processed works of respective works calculated at the load calculation section of FIG. 2;

FIG. 21 is a view showing one form of the process step load in the flow chart of FIG. 20;

FIG. 23A is one form of an equipment load relating to a finished product a(1) of a finished product code b=1 in the flow chart of FIG. 22;

FIG. 23B is one form of an equipment load relating to a finished product a(2) of a finished product code b=2 in the flow chart of FIG. 22;

FIG. 25 is a view showing one form of the processing capability data of respective equipments;

FIG. 26 is one form of a list of excess equipments outputted from the load calculation section of FIG. 24;

FIG. 28 shows one form of the excess rate and excess quantity of equipments in the flow chart of FIG. 27;

FIG. 30 is one example of a reduction policy of a load designated by an excess load reduction section of FIG. 29;

FIG. 31 is one example of a process step load following the reduction of the load by the excess load reduction section of FIG. 24;

FIG. 37A shows a state of production in an initial phase;

FIG. 37B shows a state of production after repeatedly performing the load reduction processing 83 times in accordance with the flow chart of FIGS. 33 to 35; and FIG. 37C shows a state of production in a final phase.

DETAILED DESCRIPTION OF THE INVENTION

Figure 1:
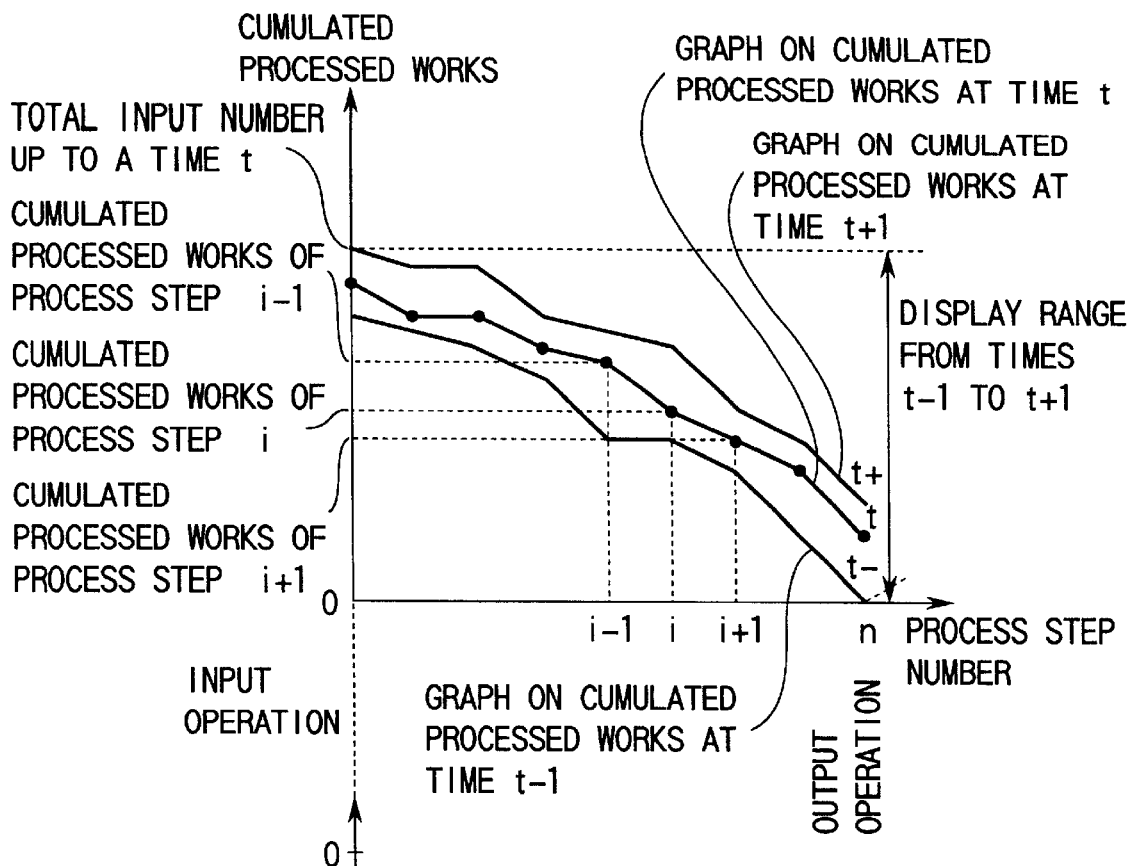
FIG. 1 shows one form of a cumulated processed works graph according to the present invention.

A preferred embodiment of this invention will be explained below with reference to the accompanying drawing.

First, the following cycle times emerging in the present specification will be defined as follows:

work: a semi-manufactured product involved from a raw material up to finished product, noting that the raw material is manufactured as a finished product through a plurality of process steps;

process: doing something generally involving a number of steps or operation;

equipment: a machine or machines for processing a raw material or work, noting that a plurality of equipments are installed in a production line;

process step: a continuous process of inputting, processing and outputting a work into, by and from a given equipment, respectively, noting that one process step includes one process or a plurality of processes, that the raw material or work is manufactured by one process step into a next step work or a finished product and that at least one of a plurality of equipments is arranged in a production line and participates in a plurality of process steps;

process flow: a sequence of process steps necessary to manufacture a finished product from a raw material;

current number of works: the stock number of works at a planning time;

target number of works: the stock number of works in the respective process steps at a planned time;

current work allocation: a result of the number of works in respective process steps in an operation flow;

target work allocation: the target work allocation in a respective process step in an operation flow;

current cumulated processed works: the total number of works processed from a given past time point involving neither a raw material nor works on a production line until a planning time;

target cumulated processed works: the total number of works to be processed by respective process steps from a given past time point involving neither a raw material nor works on a production line until a future planned time, noting that it corresponds to a stored number of respective process steps at a planned time point;

actual cycle time: a time required from the actual inputting of a raw material onto a production line to the actual outputting of a finished product, noting that the actual cycle time of production includes not only a process time but also a conveying time and standby time;

theoretical cycle time: a processing time corresponding to the actual cycle time of production minus the conveying time and standby time;

specific cycle time: a ratio of an average actual cycle time of production, a, to the theoretical cycle time of production, b, (a/b);

inputting operation: the operation of inputting a raw material to a production line;

outputting operation: the final operation of outputting a finished product from the production operation:

process step load: the number of works to be processed in respective process steps at a future planned time, noting that the load is given by a difference between the current cumulated processed works and a target cumulated processed works of respective process steps;

equipment load: the number of works to be produced at respective equipment by a future planned time, noting that the number of works is given as a difference between the current cumulated processed works of respective equipments and a target cumulated processed works of respective equipments.

target production: the target number of products manufactured by a planned time point.

Then a graph on the total processing time is defined as follows:

FIG. 1 shows one example of a graph relating to the current cumulated processed works where the abscissa represents the process flow and the ordinate, the current cumulated processed works of respective process steps. The graph above represents the current cumulated processed works of respective process steps arranged along the process flow. The graph relating to the current cumulated processed works at a planning step shows an "operated" state of the production line at the planning time. A time sequential variation on the operated state of the production line is found from a different plurality of the current cumulated processed works s at different corresponding time points.

FIG. 1 is a graph showing three current cumulated processed works at times t−1, t, t+1. It is to be noted that the graph relating to the current cumulated processed works represents a maximal current cumulated processed works at the highest upstream input process step and a minimal current cumulated processed works at the lowest downstream output process step, that is, there is a monotonically decreasing tendency toward a downstream side.

(First Embodiment)

Figure 2:
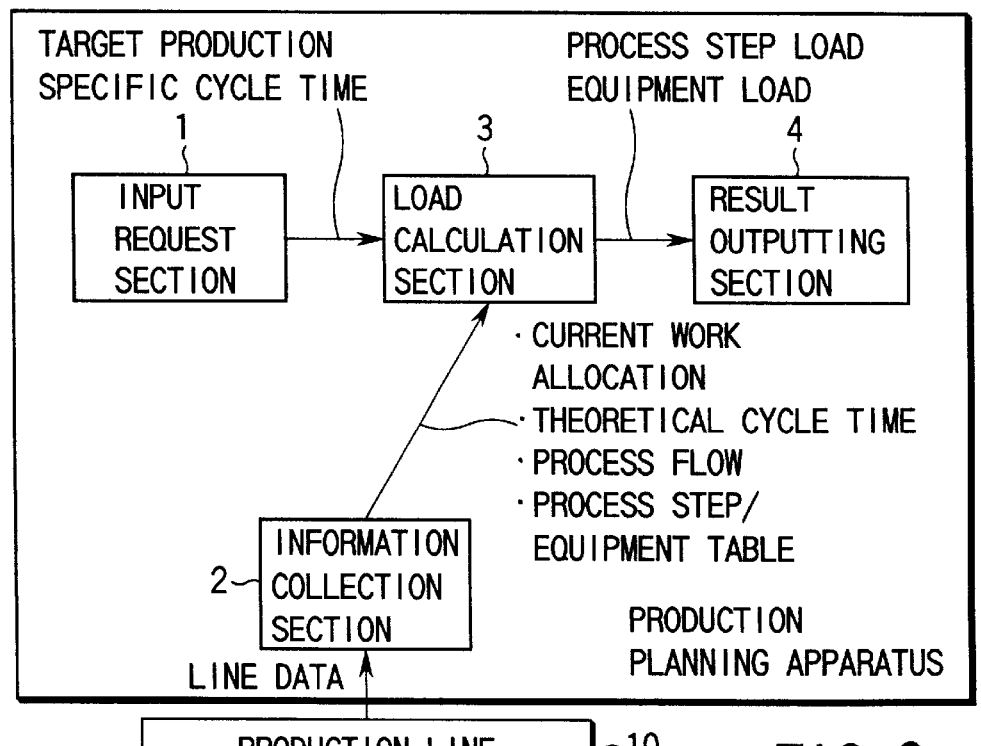
FIG. 2 is a schematic view showing a production planning apparatus according to a first embodiment of the present invention.

FIG. 2 shows a schematic form of a production planning apparatus according to a first embodiment of the present invention. The apparatus comprises a request inputting section 1, information collection section 2, load calculation section 3 and a result outputting section 4.

The request inputting section 1 has an input device, such as a keyboard, and is adapted to input target production data and target data, etc., of the specific cycle time of production.

An information collection section 2 is provided for collecting, from a production line 10, process flow data, the current works allocation, theoretical cycle time of production data, process step/equipment table data representing a process-step/equipment correspondence relation, etc.

The load calculation section 3 is provided to calculate the process step load and equipment load on the basis of the inputted and collected data.

The result outputting section 4 has a display for displaying the process step load and equipment load calculated at the load calculation section 3.

An explanation will be given below about the load calculation section 3. For convenience in explanation let it be assumed that two kinds of products a(1), a(2) are manufactured on a sharing production line and that the planned time point is after one month.

The load calculation section 3 is mainly directed to calculating the process step load and equipment load necessary to, after one month, achieve the target production inputted from the request inputting section 1.

Figure 3:
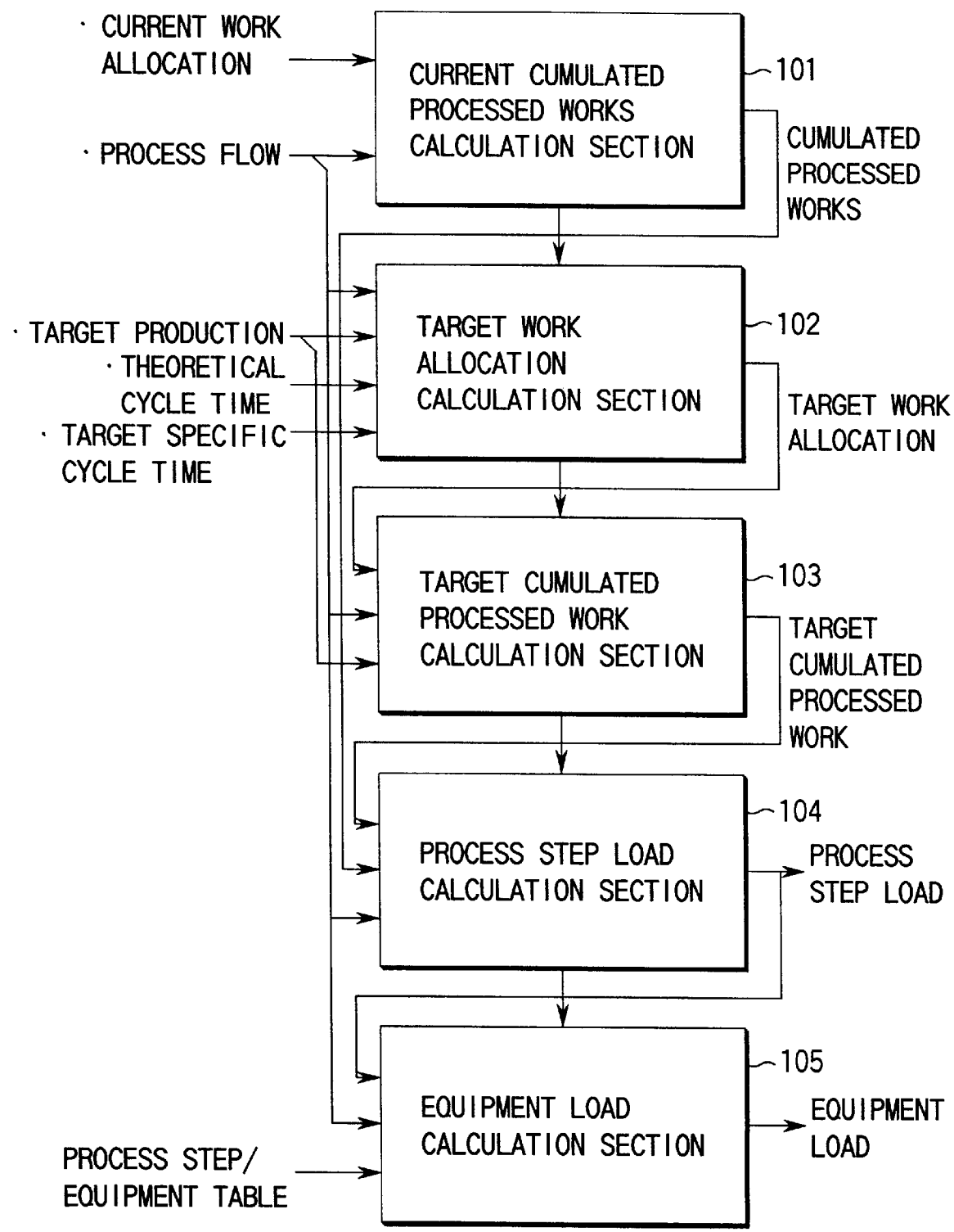
FIG. 3 is a schematic view showing a load calculation section in FIG. 2.

FIG. 3 shows one format of load calculation section 3. A current cumulated processed works calculation section 101 calculates a current cumulated processed works of the finished product a(1) and current cumulated processed works of the finished product a(2) on the basis of the current work allocation of the finished product a(1 (FIG. 4A), the current work allocation of the finished product a(2) (FIG. 4B) and the process flow (FIG. 5) which are collected by the information collection section 2.

A target work allocation calculation section 102 calculates, for each process step, the number of works produced during a period from the planning time point to the planned time point on the basis of the target production (FIG. 6) of respective finished products after 3 months which are inputted from the request inputting section 1, the theoretical cycle time of production of the respective finished products, the target of the specific cycle time of production of the respective products and the process flow. This is referred to as the work allocation target.

A target cumulated processed works calculation section 103 calculates, for each process step, a target cumulated processed works at the planned time point on the basis of the process flow, the target production, and the target work allocation by the target work allocation calculation section 102.

Based on the operation flow, the current cumulated processed works calculated by the current cumulated processed works calculation section 101, and a target cumulated processed works calculated by the target cumulated processed works calculated section 103, a process step load calculation section 104 calculates the process step load (see FIG. 9) and is outputted to a result outputting section 4.

Based on a process step/equipment table (FIG. 8) collected from the information collection section 2, the process flow and the process step load calculated by the process step load calculation section 104, an equipment load calculation section 105 calculates an equipment load (FIG. 10) of the respective equipment and it is outputted to the result outputting section 4.

Then an operation of the load calculation section 3 will be explained in more detail below.

(A) The current cumulated processed works calculation section 101 is:

input data: the current work allocation (FIGS. 4A, 4B) of the process flow (FIG. 5) and output data: the current cumulated processed works of respective process steps (FIG. 12).

Figure 11:
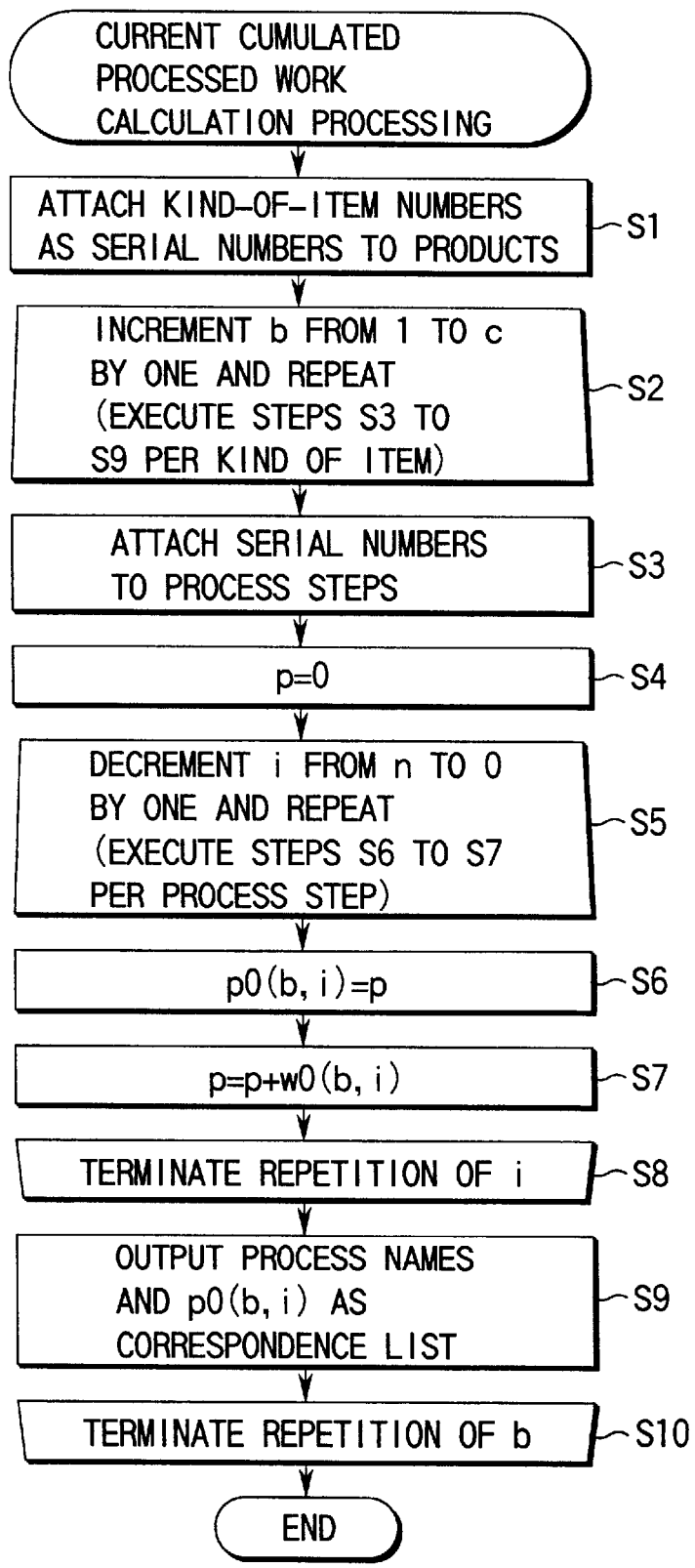
FIG. 11 is a flow chart showing a calculation processing procedure of calculating the current cumulated processed works at the load calculation section in FIG. 2.

FIG. 11 shows processing steps of the current cumulated processed works calculation section 101. The current cumulated processed works in the respective process steps corresponds to a total number of works passed through the respective process steps and, therefore, is obtained by cumulatively calculating the current cumulated processed works downstream of the respective process steps from a respective given process step.

step S1: attach a kind-of-item number b.

step S2 to S9: execute steps S2 to S9 on one kind of an item on a once-per-step basis.

step S3: attach a process step number i (=0, 1, 2, . . . ), noting that c represents a maximal value of the process item number and that a finished product a(1) is produced at six operation steps from the initial inputting process step to the final outputting process step, hence c=5.

step S4: initialize the current cumulated processed works p to "0".

steps S5 to S8: perform a loop-processing using i as a loop variable. The variable i is decremented by one each time a loop from step S5 to step S8 is passed. The loop of step S5 to step S8 is repeated until i=0.

step S6: The current cumulated processed works p0 of the current cumulated processed works from the process step at the lowest downstream side of the kind-of-item number b to the i-th process step is given by p0 (b, i), the p0 (b, i) being substituted into p.

step S7: the current number of works w0 in the I-th process step on the kind-of-item number b is represented by w0 (b, i). The value w0 (b, i) is added to p. For the product a(1) at the kind-of-item number b=1, for example, the process in which the current cumulated processed works at the process step number i=5 to 0 are cumulatively added is shown in FIG. 13.

step S9: for i=0, 1, . . . , n, those outputted on pairs of process step names and p0 (b, i) are shown in FIG. 2.

(B) The Target Work Allocation Calculation Section 102 input data: the process flow (FIG. 5), target production (FIG. 6), theoretical cycle time of production (FIG. 7), target (FIG. 7) of the specific cycle time of production.

output data: the target work allocation (FIG. 16).

Figure 14:
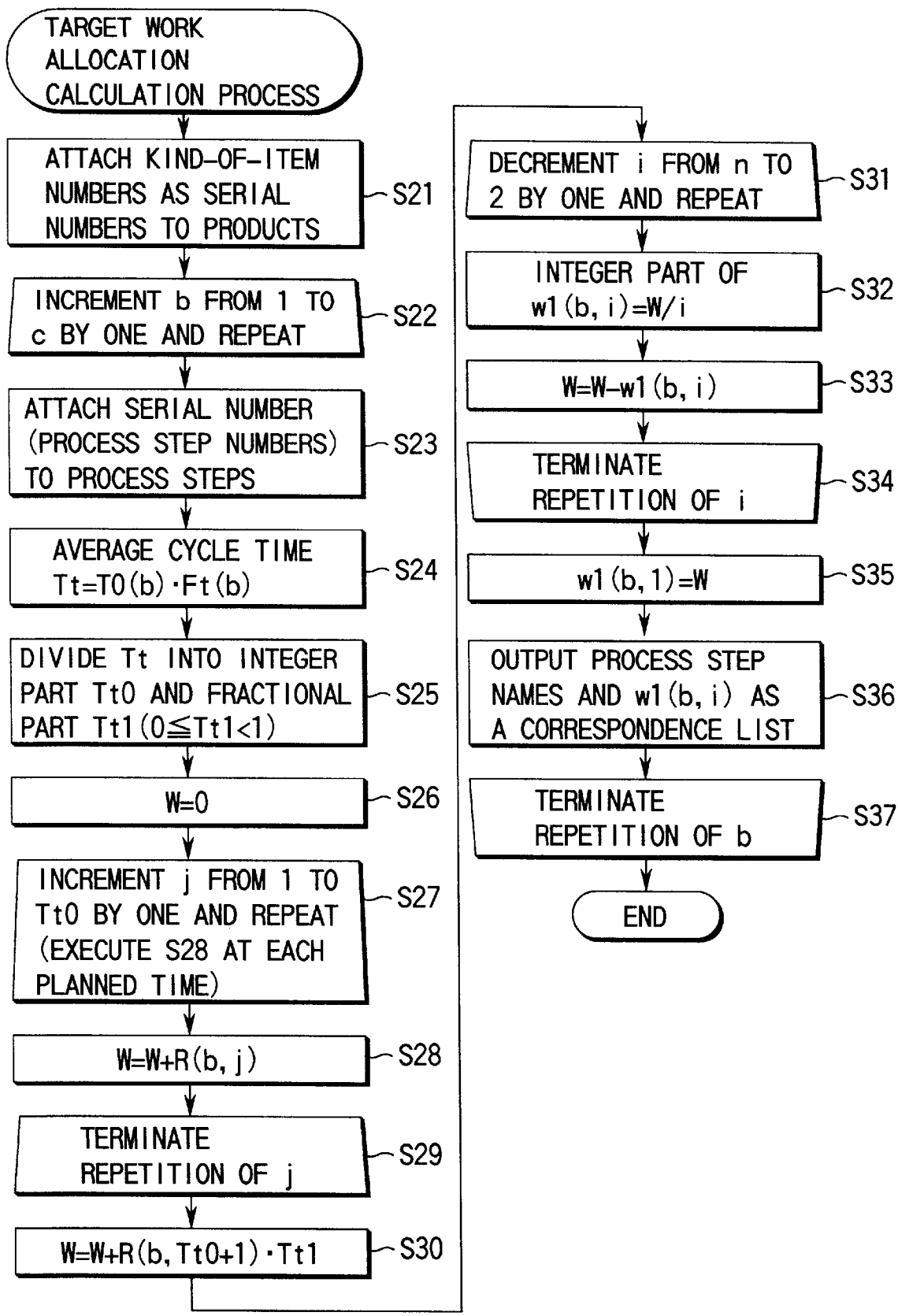
FIG. 14 is a flow chart showing a procedure of calculating the target work allocation at the load calculation section in FIG. 2.

The processing operation of the target work allocation calculation section 102 will be explained below with reference to the flow chart in FIG. 14.

Based on the target production (FIG. 6) at three individual month interval-planned times and average cycle time of production of respective finished products here in the processing, calculation is made on the target production in the average cycle time of the respective finished products and a result of calculation is equally distributed on the respective process steps and, in order to achieve the target production in the unit periods, calculation is made on the target number of works to be allocated to the respective process steps.

step S21: the same as step S1 in FIG. 11.

steps S22 to S37: loop processing is carried out using b as the loop variable. The initial value b is given by ⌈1⌉ and incremented by 1 each time the loop is passed once and at a b=c time the loop processing is terminated.

step S23: attach the numbers starting from ⌈1⌉ to process steps in the process flow in FIG. 5 and recordings are made on the correspondence Table. For the production a(1) in FIG. 5, a first input process step is ⌈0⌉, the next process step p1 is "1", . . . , and a final output process step is ⌈5⌉. The number attached to the output process step is substituted into a variable n(b). Here, the five process steps are on the product a(1) and hence (1)=5 and four process steps are on the product a(2) and hence (2)=4.

step S24: using the average cycle time of production Tt=T0(b)·Ft(b), calculation is made whereby T0(b) represents the theoretical cycle time of production and Ft(b), a target specific cycle time of production. For the product a(1) of the product number b=1, for example, it is found from FIG. 7 that the average cycle time of production Tt=1.5.

step S25: the average cycle time of production, Tt, is divided into an integer part Tt0 and fractional part Tt1.

$$Tt = Tt0 + Tt1$$

where Tt0: an integer $$0 \leq Tt1 < 1$$

Since the average cycle time of production Tt=1.5 for the product a(1) of the product number b=1, Tt0=1, Tt1=0.5.

step S26: an initial value ⌈0⌋ is given to the process step variable W.

steps S27 to S29; loop processing is done with a loop variable j. The initial value of j is ⌈1⌋ and is incremented by one each time the loop is passed once, and the loop processing is repeated until j=1−Tt0.

step S28: add a process step variable W and R (b, j). Here, R (b, j) is values of the target production in FIG. 6 with respect to a month j (a number 0 is attached to a current month, 1, the next month, . . . ). For the product a(1) of the production number b=1, for example, Tt0=1. And the loop processing is done once and, at the completed of the loop, the target production value at j=1 reaches W=300.

step S30: further, add a product of R (b, Tt0+1) times Tt1 to the process step variable W. For the product a(1) of the product number b=1, for example, W=300, Tt0=1, and Tt1=0.5. As evident from FIG. 6, the product target value at j=2 reaches R (b, Tt0+1)=400 and hence W=500.

steps S31 to S34: loop processing is down with a loop variable j. The initial value of i is n(b) and is decremented by one each time the loop is passed once. Here, since the products as an object are two kinds of items, loop processing is completed at i=2 times times.

step S32; the target number of works in the i-th process step of the product number b is represented by w1 (b, i). By substituting the integer part of W/i into w1 (b, i), a quantity W of the target production of each product in a unit period (for example, one month) is equally distributed to each process step.

step S33: a subtraction operation W−w1 (b, i) is carried out. FIGS. 15A and 15B, respectively, show (1) a calculation process of a target number of works up to the process step number i=5 to 2 for the product a(1) of a product number b=1, for example and (2) a calculation process of a target number of works up to the process step number i=4 to 2 for the product a of the product number b=2 for example. At the end of the loop, W=100 at b=1, and W=88 at b=2.

step S35: the value of W at the cycle timeination of the loop is substituted into w1 (b, i). For example, the target number of works of the process step number i=1, for the product of the product number b=1, becomes w1 (1, 1)=100 and the target number of works of the process step number i=1 for the product of the product number b=2 becomes w1 (2, 1)=88.

step S36: for i=0, 1, . . . , n, the process step name and target number of works are outputted as a pair and FIG. 16 shows the pairs of the process step name for each product and target number of works.

(C) The Target Cumulated Processed Works Calculation Section 103 input data: the target number of works (FIG. 16), process flow (FIG. 5), target production (a current month in FIG. 6)

output data: the target cumulated processed works of the respective process steps (FIG. 19)

Figure 17:
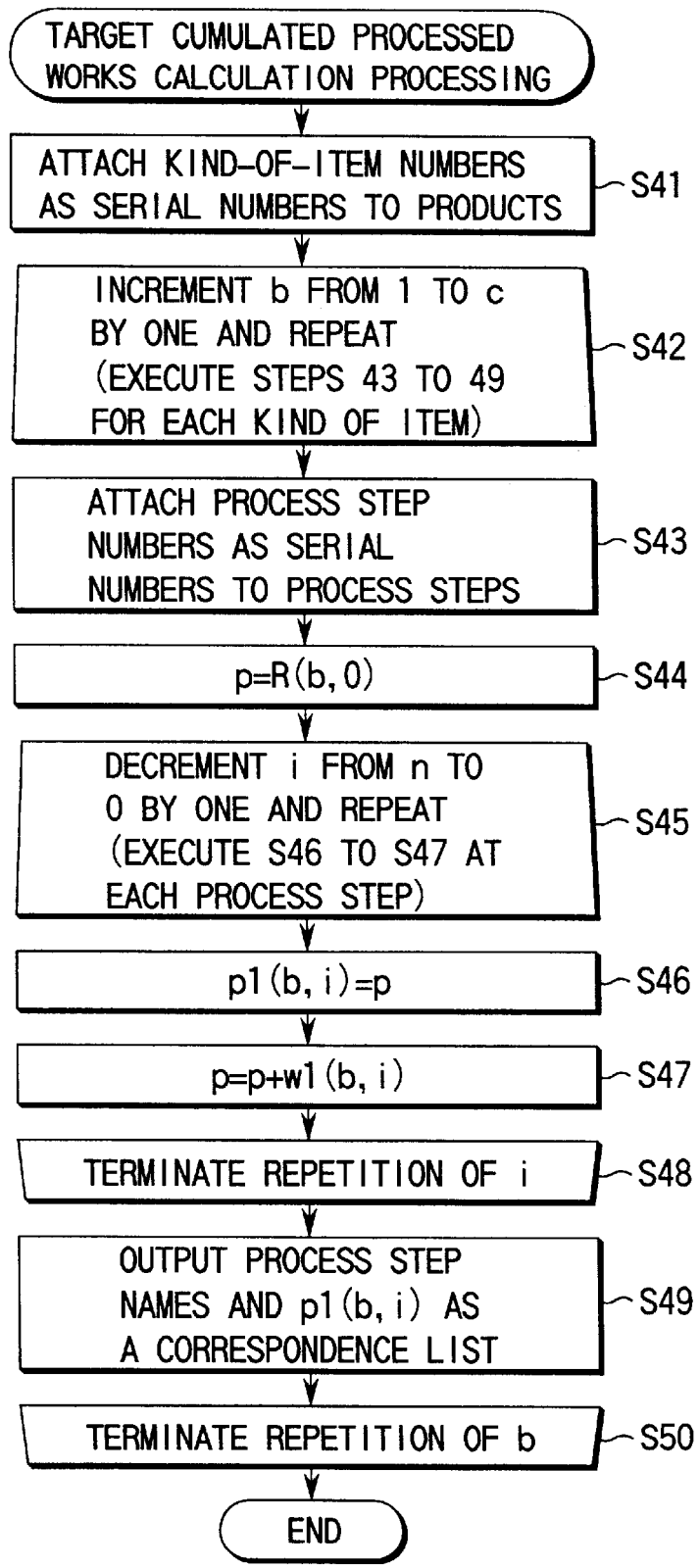
FIG. 17 is a flow chart showing a calculation processing procedure for calculating the target cumulated processed works at the target calculation section of FIG. 2.

The processing operation of the target cumulated processed works calculation section 103 will be explained below with reference to a flow chart in FIG. 17. The target cumulated processed works of respective process steps may be calculated from the target work allocation in FIG. 16. For example, the target cumulated processed works of process steps (i) is given by a total of target number of works from the next process step (i+1) to a final output process step.

step S41: the same as in step S1 in FIG. 11.

step S42 to S50: the initial number of b is given by [1] and is incremented by [1] each time the loop is passed once. And the loop processing is completed at "b=c" times. Here, an explanation is given about a finished product a(1).

step S43: the same as in step S3 in FIG. 11.

step S44: the target p of the current cumulated processed works is initialized to a target production 300 at a current month of a finished product a(1).

steps S45 to S48: loop processing is carried out using i as a loop variable. Here, the initial value of i is 5 and is decremented by one each time the loop is passed once. The loop processing is repeated until "i=0" times for all the operations.

step S46: the target p1 of current cumulated processed works to the i-th process steps from the lowest downstream process step of the finished product a(1) is represented by p1 (b, i). The value p is substituted into the p1 (b, i).

step S47: the current number of works w1 of i-th process steps on the kind-of-item number b represents w1 (b, i). The value of w1 (b, i) is added to the p. FIG. 18 shows a process of cumulatively adding the target number of works at a process step number i=5 to 0 to the target production value [300] at a current month (zero month) for the finished product a(1) for instance.

step S49: the process step name and target p of the current cumulated processed works p1 (b, i) are outputted as pairs at i=0, 1, . . . , n. One example is shown in FIG. 19.

(D) The Process Step Calculation Section 104 input data: the process flow (FIG. 5), the current cumulated processed works (FIG. 12) and the target cumulated processed works (FIG. 19)

output data: the process step load (FIG. 9)

Figure 20:
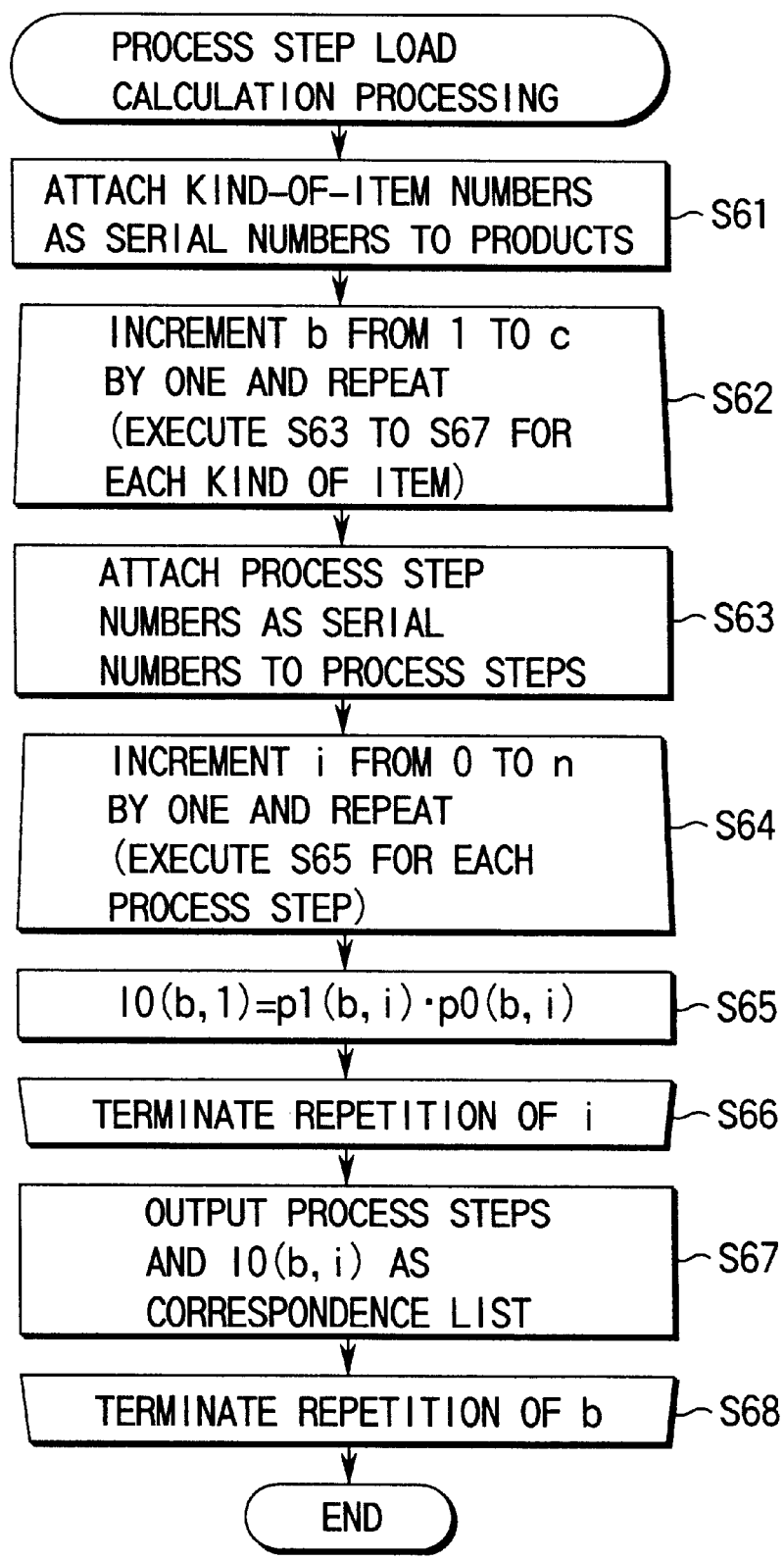
FIG. 20 is a flow chart showing a calculation processing procedure for calculating a process step load at the load calculation section of FIG. 2.

The processing operation of the process step load calculation section 104 will be explained below with reference to a flow chart in FIG. 20. The process step load is found by subtracting the current cumulated processed works calculated at the current cumulated processed works calculation section 101 from the target cumulated processed works calculated at the target cumulated processed works calculation section 103.

step S61: the serial number is attached to the finished products and the number of the final finished product is represented by c. Since, here, two kinds of finished products are as an object, c=2.

steps S62 to S68: loop processing is done using b as a loop variable. The initial value of b is given by [1] and is incremented by one each time the loop is passed once. The loop processing is completed at "b=c" times.

step S63: the numbers starting from [0] are attached, in a processing order, to the process steps in the process flow and recordings are made on a corresponding table. For the finished product a(1), the first inputting process step is [0], the next process step p1 is [1], . . . , and the final outputting process step is [5]. The number attached to the outputting process step is substituted into the variable n(b). Here, the finished product a(1) comprises five process steps and (1)=5. And the finished product a(2) comprises four process steps and n(2)=4.

steps S64 to S66: loop processing is done using i as a loop variable. The initial value of i is given by [0] and is incremented by one each time the loop is passed once. The loop processing is repeated until i=n times for all the process steps.

step S65: the load of the i-th process step of the finished product code b is represented by 10 (b, i).

Further, the current cumulated processed works of the i-th process step of the finished product code b is represented by p0 (b, i) and the target cumulated processed works is represented by p1 (b, i). Using, for example, the current cumulated processed works p1 (b, i) as shown in FIG. 12 and value of the target cumulated processed works p0 (b, i) as shown in FIG. 19, a value of p1 (b, i)–p0 (b, i) is substituted into the process step load 10 (b, i). For the finished product a(1) of the finished product code b=1, for example, the process for calculating the load 10 (1, i) of respective process steps i=0 to 5 is shown in FIG. 21.

step S67: The pair of the process step name and process step load 10 (b, i) are output for the respective operation steps i=0, 1, . . . , n. One example of it is shown in FIG. 9.

(E) The Equipment Load Calculation Section 105 input data: the process flow (FIG. 5), process step/ equipment table (FIG. 8), process step load (FIG. 9)

output data: the equipment load (FIG. 10)

Figure 22:
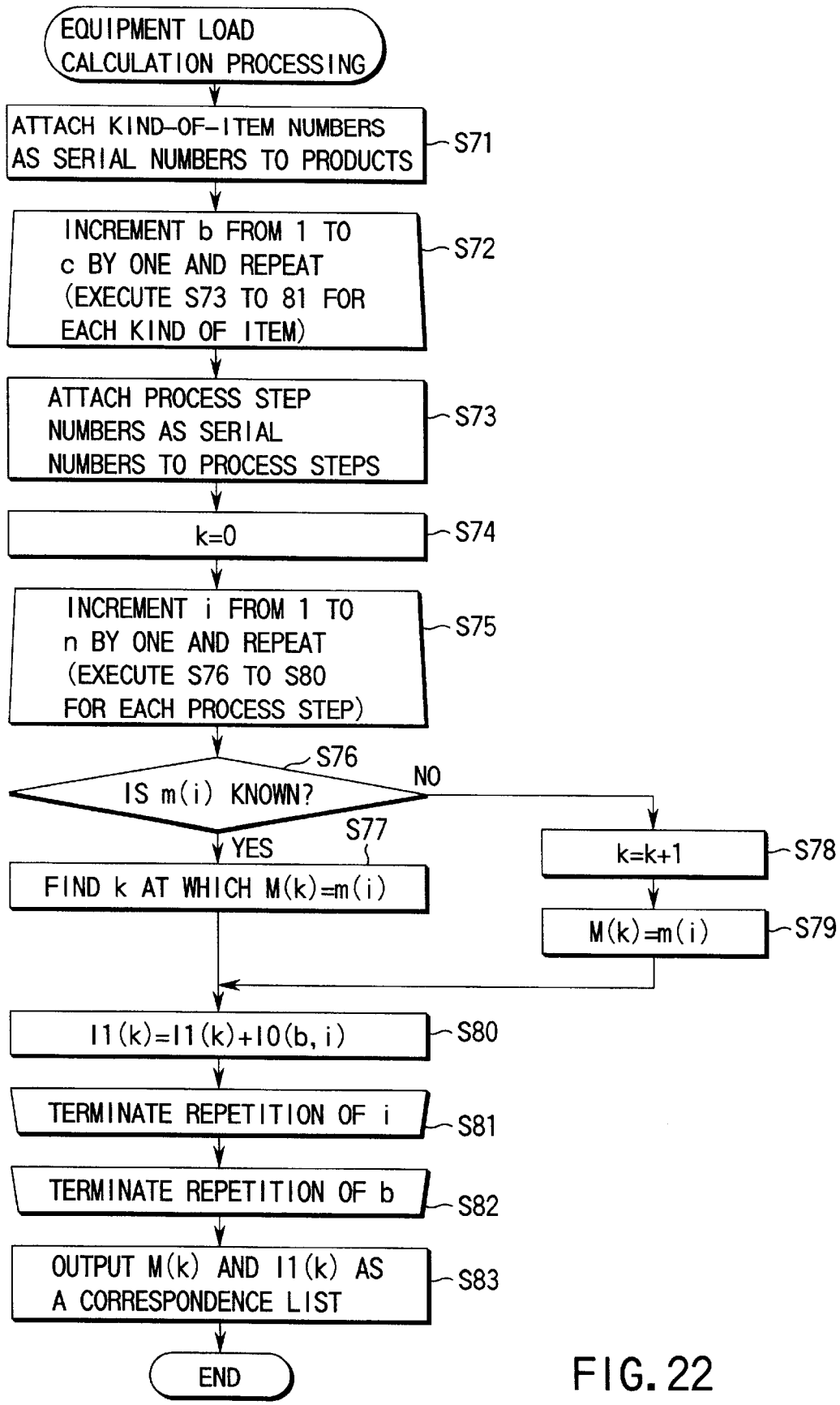
FIG. 22 is a flow chart showing a calculation processing procedure for calculating an equipment load in the load calculation section of FIG. 2.

The processing operation of the equipment load calculation section 105 will be explained below with reference to a flow chart as shown in FIG. 22. In the processing here, the process step loads calculated at the process step load calculation section 104 are totalized for the respective equipment to find an equipment load.

step S71: the same as the step S1 in FIG. 11.

steps S72 to S78: the loop processing is carried out using the kind-of-an item number as a loop variable. The initial value of b is given as b and incremented by "1" each time the loop is passed once. The loop processing is completed at "b=2" times. Here, c=2.

step S73: Those numbers starting from [0] are attached, in a processing order, to the respective steps in the process flow and recordings are made on a correspondence table. For the product a(1) in FIG. 5, an initial input process step becomes [0], the next process step p1 becomes [1], . . . , and a final outputting process step becomes [5]. The number attached to the output process step is substituted into a variable n(b). For the product a(1) here, five process steps are used and n(1)=5. And for the product a(2), four process steps are used and n(2)=4.

step S74: the initial value [0] is attached to the process step variable k.

steps S75 to S81: the loop processing is done using i as a loop variable. The initial value i is given as [1] and is incremented by [1] each time the loop is passed once. The loop processing is completed at "i=n" times.

step S76: the processing equipment used for processing a work on the process step of the process step number i is represented by m(i) with reference to FIG. 8. Checking is made to see whether or not the processing equipment m(i) is an already emerging processing equipment. If Yes, then that step goes to a step S77 and, if No, goes to step S78.

step S77: this step finds a value k at which M(k)=m(i).

step S78: the k is incremented by one.

step S79: the m(i) is substituted into the M(k).

step S80: For the process step variable k for identifying the respective equipment, the load of the k-th equipment is represented by I1(k). Further, the load of the i-th process step of the product number b is represented by 10(b, i). The value of the process step load I(k) is added to the value of the process step load I(k). For the respective process steps i=1, to 5 of the product a(1) of the product number b=1, for instance, the process for adding the process step loads for the respective equipment and finding an equipment load is shown in FIG. 23A. For the respective steps i=1, to 4 in the product a(2) of the product number b=2, the process for adding the process loads for each equipment and finding an equipment load is shown in FIG. 23B.

step S83: for k=1, 2, 3, the equipment name M(k) and equipment load I1(k) are output as a pair. One example of it is shown in FIG. 10.

As set out above, it is possible to, by finding the process step load, to predict an amount of process step necessary to achieve the target production and to help make a proper process step plan. And by finding the equipment load, comparison is made between the processing capability of the equipment and the target achievement load to know an excess or shortage of the processing capability. By doing so it is possible to help make a proper equipment (investment) plan, an equipment operation (utilization of the existing equipment) plan and a manpower placement plan.

(Second Embodiment)

Figure 24:
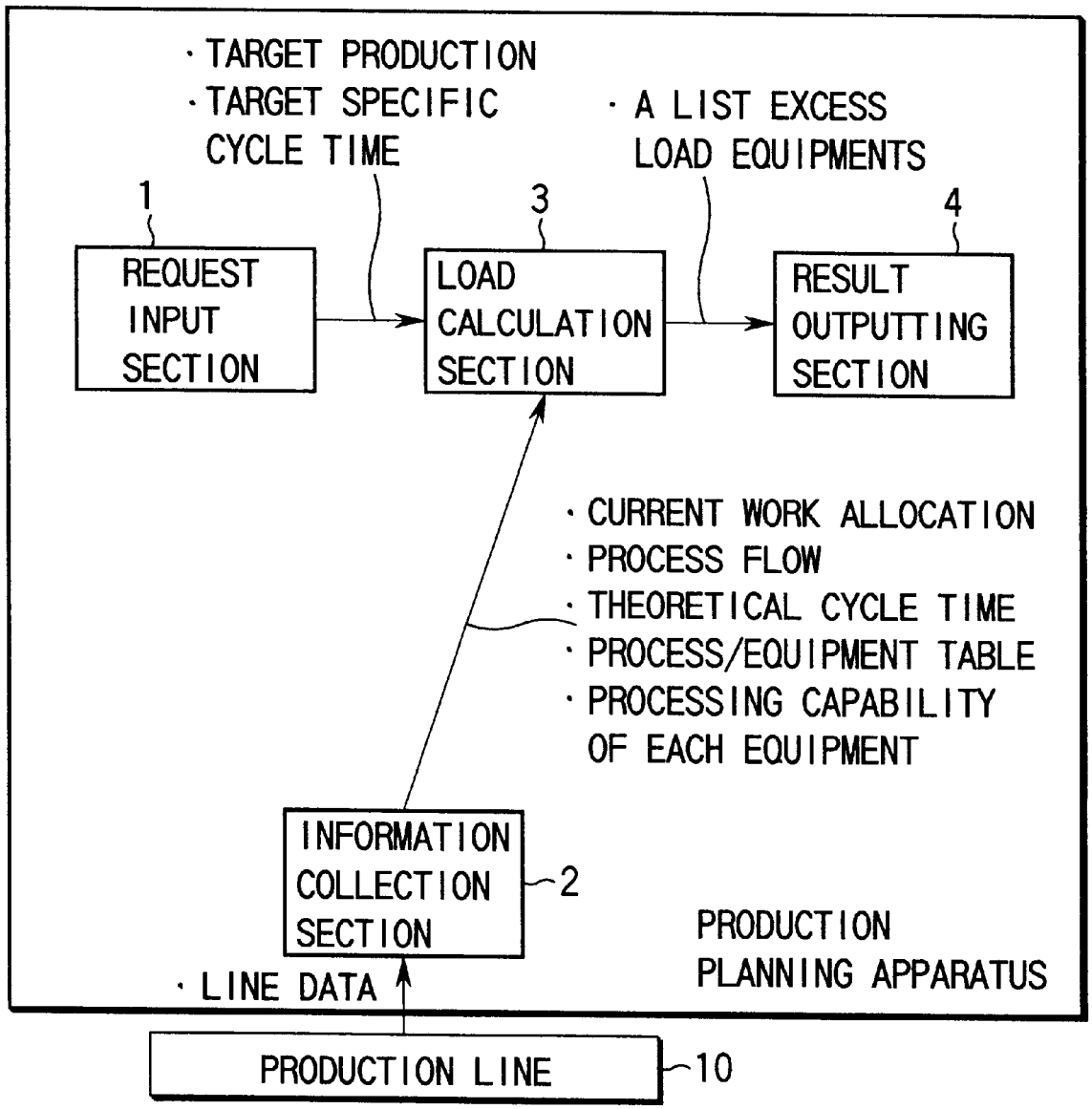
FIG. 24 is a schematic view showing a production planning apparatus according to a second embodiment of the present invention.

FIG. 24 shows one form of an arrangement of a production planning apparatus according to a second embodiment of the present invention, the production comprising a request input section 1, an information collection section 2, a load calculation section 3 and a result output section 4. In FIG. 24, the same reference numerals are employed to designate parts or elements corresponding to those shown in FIG. 2 and an explanation is restricted to a different portion, that is, to the operation of the load calculation section 3.

Although, in the load calculation section 3 of the first embodiment, the process step load and equipment load are found based on the current cumulated processed works and the target cumulated processed works of respective process steps, the production planning apparatus of the second embodiment is such that the load calculation section 3 picks up those equipments whose calculated equipment loads exceed their calculated processing capabilities, finds their excess quantity and excess percentages and outputs these as a list of excess loads.

The load calculating section 3 receives not only those explained in connection with the first embodiment but also data on the processing capabilities of the respective equipments. The output data are a list of, as shown in FIG. 26, the equipments whose equipment loads exceed their processing capabilities as well as their excess percentages and excess quantity.

Figure 27:
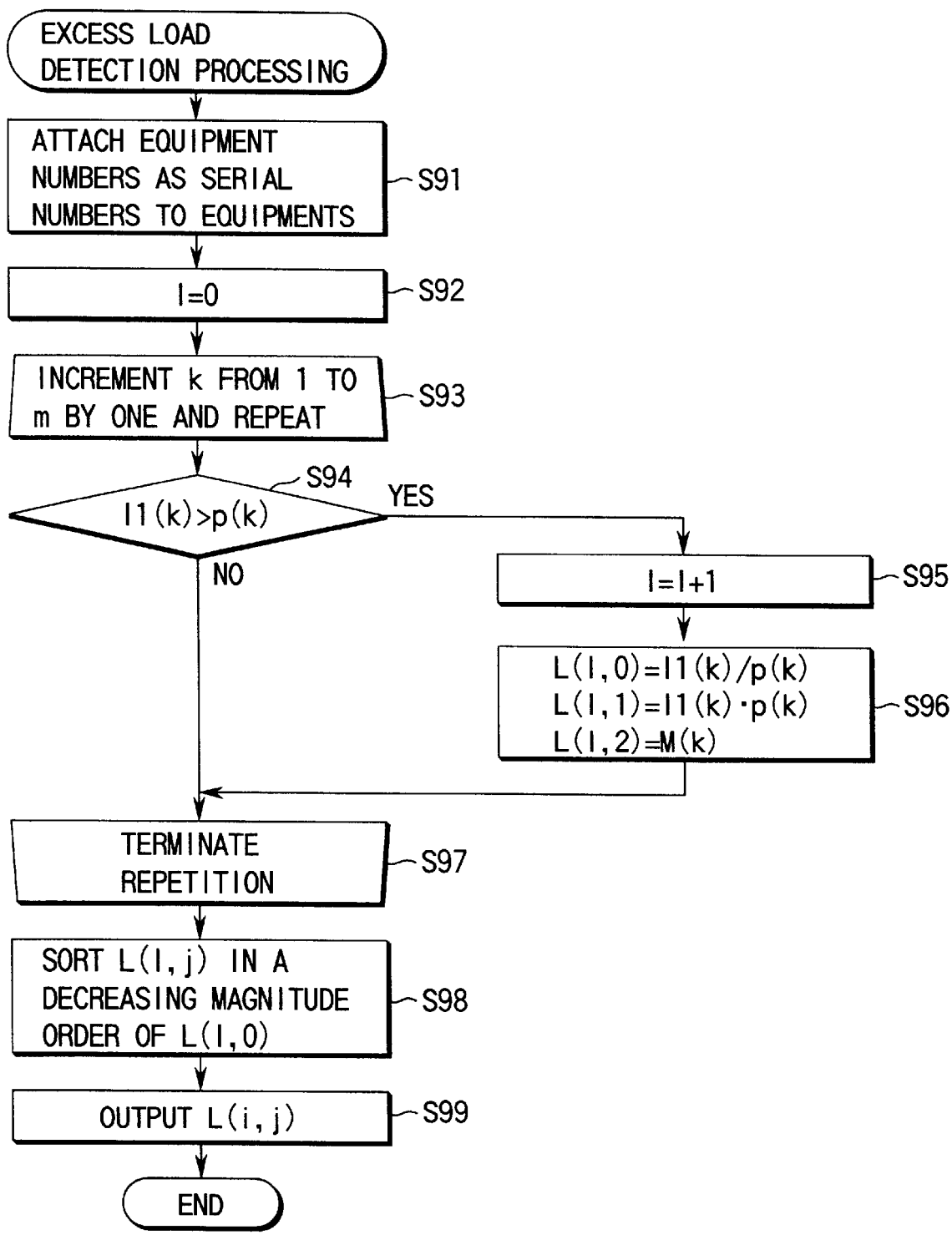
FIG. 27 is a flow chart showing a detection processing procedure of detecting an excess load at the load calculating section of FIG. 24.

The processing for calculating the equipment loads at the load calculation section 3 is as in the first embodiment. The processing for detecting the excess load based on the calculated equipment load will be explained below with reference to the flow chart shown in FIG. 27. Here, an explanation will be given below, by way of an example, about calculating an excess load based on the values of the equipment loads as shown in FIG. 10 and the values of the processing capabilities as shown in FIG. 25.

step S91: the equipment numbers are attached as serial numbers to the equipments. A maximum number of those equipment numbers is substituted into a variable m.

step S92: An initial value [0] is given to the process step variable 1.

steps S93 to S97: loop processing is carried out using k as a loop variable. The initial value of k is given as [1] and incremented by 1 each time the loop is passed once. The loop processing is completed at "k=m times". That is, the loop processing is implemented for all the equipments.

step S94: the load of a k-th equipment obtained from FIG. 10 is represented by I1(k). Further, the processing capability of the k-th equipment obtained from FIG. 25 is represented by p(k).

A comparison I1(k)>p(k) is carried out. And when the load exceeds the processing capability and an excess load is detected (YES), the step goes to step S95.

step S95: the process step variable 1 is incremented by [1].

step S96: the process step array L (I, j) (j=0, 1, 2) is defined. And an excess percentage I1(k)/p(k) is substituted into an element L (I, 0) of the process step array, an excess quantity I1(k)−p(k) is substituted into an element L (I, 1) of the process step array and a load excess equipment name M(k) is substituted into an element L (I, 1) of the process step array.

The transition of the respective variables at the execution of the above-mentioned processing for the respective equipment of k=1 to 3 is shown in FIG. 28.

step S98: the process step array L (I, j) is sorted in a decreasing value order of its elements L (i, 0).

step S99: L (1, j) (j=0, 2, 1) is output at I=1, 2, 3. One example is shown in FIG. 26.

(Third Embodiment)

Figure 29:
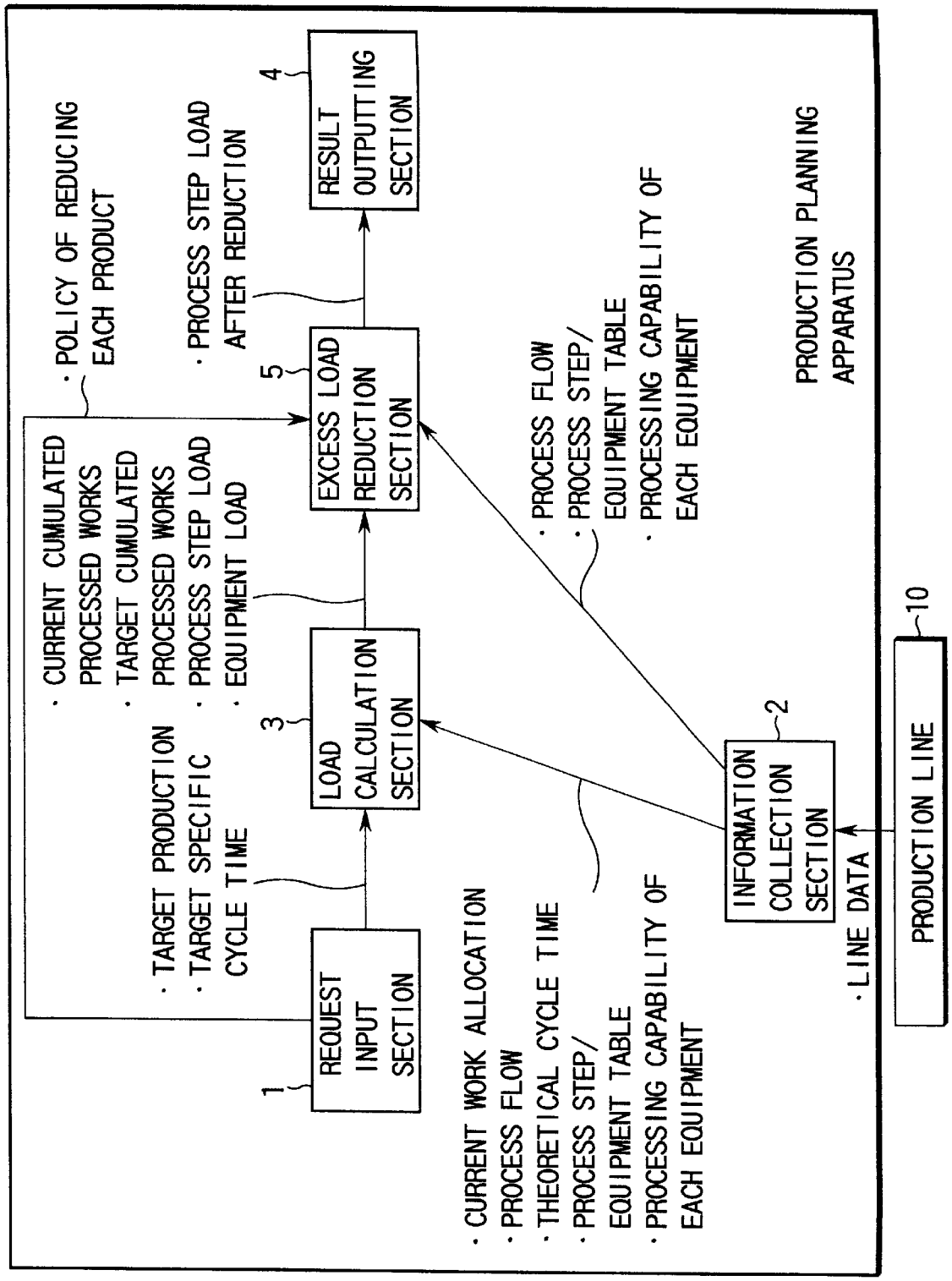
FIG. 29 is a schematic view showing a production planning apparatus according to a third embodiment of the present invention.

FIG. 29 shows a schematic form of a production planning apparatus according to a third embodiment of the present invention. The apparatus comprises a request input section 1, an information collection section 2, a load calculation section 3, an excess load reduction section 5 and a result outputting section 4. In this embodiment, the same reference numerals are employed to designate parts or elements corresponding to those shown in FIG. 2 and further explanation is restricted only to a different portion. That is, in the embodiment shown in FIG. 29, the excess load reduction section 5 is added which is adapted to reduce the target cumulated processed works of respective process steps and reduce the excess load.

An explanation will be given below about an excess load reduction section 5.

The featuring aspect of the input data of the excess load reduction section 5 is in a reduction policy as shown in FIG. 30. The output data is process step loads whose contents are revised in a down shift direction (load reduction) as shown in FIG. 31.

Here, the load reduction method will be explained below with reference to FIGS. 32A, 32B and 32C.

Figure 32A:
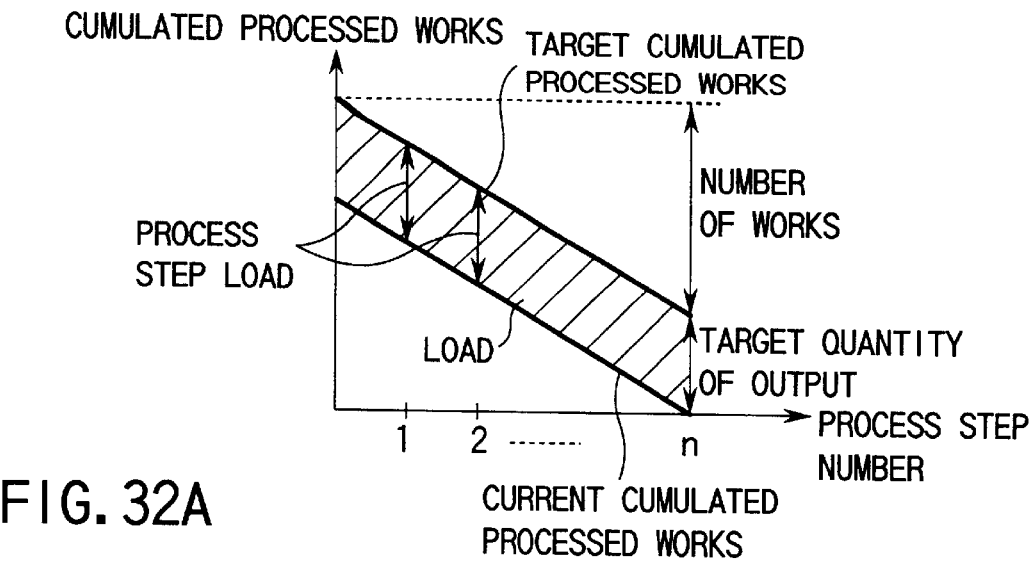
FIG. 32A is a view showing the difference between the current cumulated processed works and the target cumulated processed works before the load reduction.
Figure 32B:
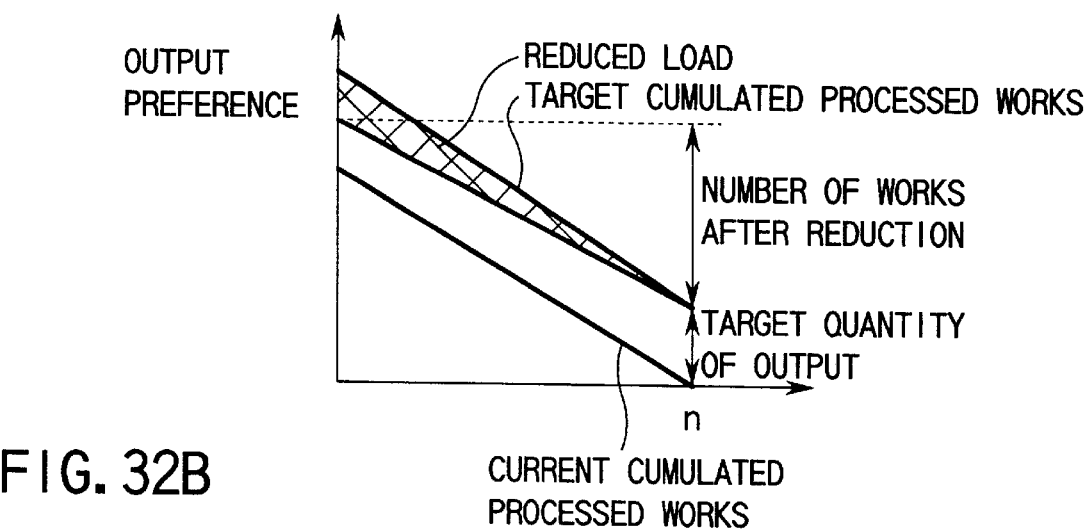
FIG. 32B is a view showing the difference between the current cumulated processed works and the target cumulated processed works after the load reduction under an "output" preference condition.

FIG. 32A shows, in brief, a graph on the total pressing number as shown in FIG. 1, noting that the graph on the current cumulated processed works of respective steps is shown by a straight line for brevity's sake.

As set out above, a difference (a hatched area in FIG. 32A) between the current cumulated processed works and the target cumulated processed works corresponds to a processing quantity of respective process steps, that is, process step loads, given to achieve an initially given target production. In this connection it is to be noted that, when the graph is viewed along the ordinate axis relative to the process step number on the abscissa, the process step load is indicated by a difference between the current cumulated processed works and the target cumulated processed works.

In the reduction policy, an "output" preference and step "remaining item" preference are prepared, one of these preferences being selectable by the operator. The "output" preference is the method by which the load is reduced with the target production fixed as shown in FIG. 32B. That is, the method is such that, in order to achieve the target production, the further upstream the process step the quantity of reduction of the process step load is more increased.

Figure 32C:
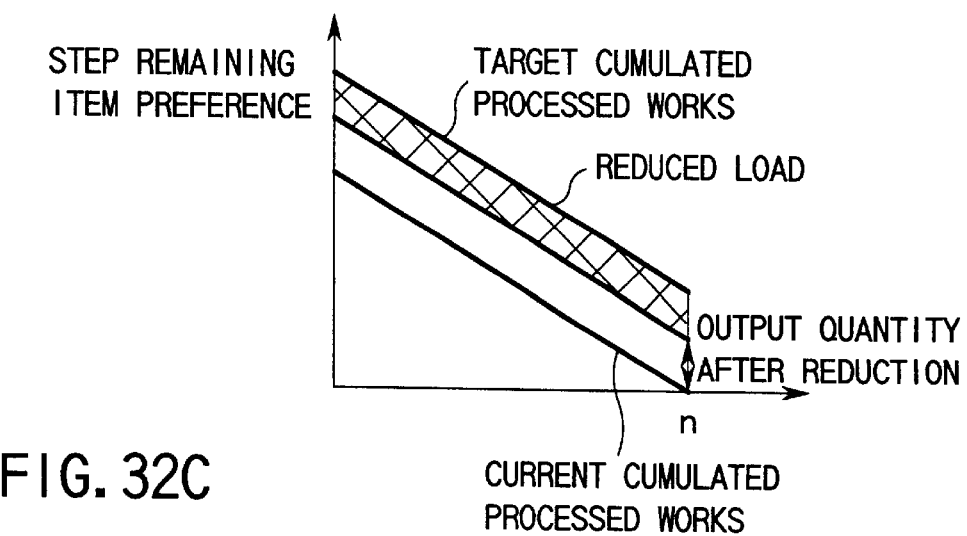
FIG. 32C is a view showing the difference between the current cumulated processed works and the target cumulated processed works after the load reduction under a step "remaining" preference condition.

Further, the step "remaining item" preference is the method by which, in order to balance the stock number of works in the respective process steps, the process step load in the respective process steps is uniformly reduced as shown in FIG. 32C. According to this method, the target production may be reduced as a result.

The excess load reduction processing of the excess load reduction section 5 will be explained below with reference to a flow chart shown in FIGS. 33 to 35.

1) preparation processing (steps S101 to S110)

The process step variable, etc., is initialized.

steps S101 to S107: loop processing is done using a kind-of-item number b as a loop variable. The initial value of b is given as ⌈1⌋ and is incremented by ⌈1⌋ each time the loop is passed. When the processing is completed (at "b=c" times) for all the products, the loop processing is terminated.

step S102: the process step numbers starting from ⌈0⌋ is attached, in the processing order, to the respective process steps in the process flow and recordings are made on a correspondence table. The number attached to the "output" operation is substituted into a variable n(b).

step S103: the initial value roJ is substituted into a variable r(b) representing a reduction percentage of the respective products.

steps S104 to S106: loop processing is carried out using a process step variable i as a loop variable. The initial value of i is given as ⌈0⌋ and is incremented by ⌈1⌋ each time the loop is passed. At the completion of the processing on the respective product in all the process steps (at the i=n times), the loop processing is terminated.

step S105: the values of the target p1 (b, i) of the current cumulated processed works of the respective process steps early found are substituted into a variable pt (b, i) representing the reduced target cumulated processed works and into a variable p2 (b, i) representing the target cumulated processed works of the load reduction. And ⌈0⌋ is substituted into a variable Δp (b, i) representing a difference between the object of the reduced target cumulated processed works and the reduced target cumulated processed works steps S108 to S110: the individual equipment number k is attached to the respective equipment and the loop proceeding is carried out using k as a loop variable. The initial value of k is given as ⌈1⌋ and incremented by "1" each time the loop is passed. The loop processing is cycle timeinated at "k=m" times (the total number of equipments).

step S109: the respective equipment load (k)/processing capability p(k) is substituted into the variable q(k) of the respective equipment load ratio representing a ratio between the initially decycle timeined processing capability and the respective equipment load.

2) the decision whether or not there exists any load exceeding an initially decycle timeined processing capability of any of the respective equipments (whether or not the load reduction is made)—step S111.

The load ratio q(k) of the respective equipment is found by the respective equipment load I1(k)/processing capability p(k) and checking is made to see whether or not q(k)≦1 in all the equipments. If this relation is not established even in one of all the equipments, that is, if even one equipment involving an excess load is detected (in the case of No), the process goes to step S119 and load reduction processing is carried out. If the above relation is established in all the equipments (in the case of Yes), the process goes to step S112 and output processing is carried out.

3) the output processing (steps S112 to S118)

steps S112 to S116: loop processing is done using a kind-of-item number b as a loop variable. The initial value of b is given as ⌈1⌋ and is incremented by ⌈1⌋ each time the loop is passed once. When the processing is completed on all the products (at "b=c" times), the loop processing is terminated.

step S113: the process step numbers (0, 1, 2, . . . ) are attached, in the processing order, to the respective process steps in the process flow of the product b and recordings are made on a correspondence table. And the number attached to the "output" process step is substituted into the variable n(b).

steps S114 to S116: loop processing is implemented using the process step variable i as a loop variable. The initial value of i is given as ⌈0⌋ and is incremented by ⌈1⌋ each time the loop is passed once. When the processing is completed on the respective products in all the process steps (at "i=n" times), the loop processing is terminated.

step S115: the difference "pt (b, i)–p0 (b, i)" between the reduced target cumulated processed works and the current cumulated processed works is substituted into a process step load 12 (b, i) in the respective process step after the reduction of the load.

step S117: The process step name and process step load 12 (b, i) in the respective process step after the reduction of the load are outputted as a pair. 4) the load reduction processing (steps S119 to S139)

Figure 36:
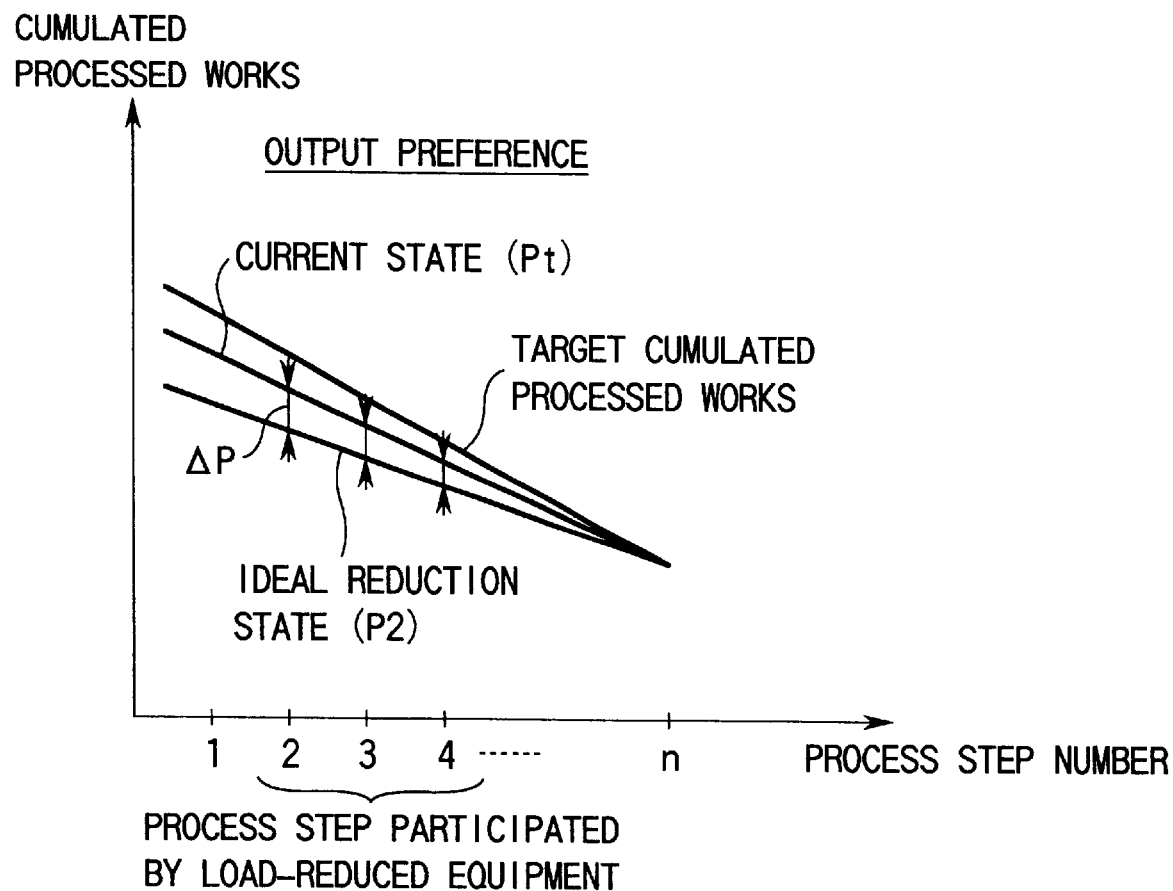
FIG. 36 is an explanatory view showing, in detail, the load reduction method corresponding to the third embodiment of the present invention.

The procedures for reducing the target cumulated processed works of the respective process steps earlier calculated by the load calculation section 3 and reducing the excess load will be briefly explained below with reference to FIG. 36.

Procedure 1: an equipment corresponding to a maximal excess load is selected (step S119). This decision is made based on a ratio between, for example, the predecycle timeined processing capability of the respective equipment and the load of the respective equipment calculated by the load calculation section 3, that is, on the load ratio q of the respective equipment.

Procedure 2: a product of the lowest one of those loads reduced up to the planning time is selected (step S120). This decision is made based on a reduction percentage r of the respective products which is based on a ratio between the addition value of the loads calculated by the load calculation section 3 in all the process steps of the product and the addition value of loads in the respective process steps after the reduction of the load in all the process steps of the products.

Procedure 3: comparison is made between an ideal reduction state (the target of the reduced target cumulated processed works) p2 along the reduction policy and a current state (reduced target cumulated processed works) pt as a result of reducing a load (Δp=p2–pt) and a process step (process step of the greatest Δp) of the lowest reduction load is selected (step S123).

Procedure 4: a predecycle timeined load quantity (processed work number) is subtracted from the current cumulated processed works pt of the selected process step and the corresponding value of the current cumulated processed works pt is updated (step S130).

Procedure 5: the target p2 of the reduced target cumulated processed works of the respective process steps corresponding to the reduction of the load from the selected process steps, that is, [the ideal load reduced state] is updated (steps S131 to 135). And the reduction percentage r of the respective products is updated (step S137).

Procedure 6: By the reduction of the current cumulated processed works p0 of the respective process steps from the reduced target cumulated processed works pt, the process step load l2 of the respective product after the reduction of the load is calculated and outputted (steps S112 to S118). One example of an output result is shown in FIG. 31.

Figure 35:
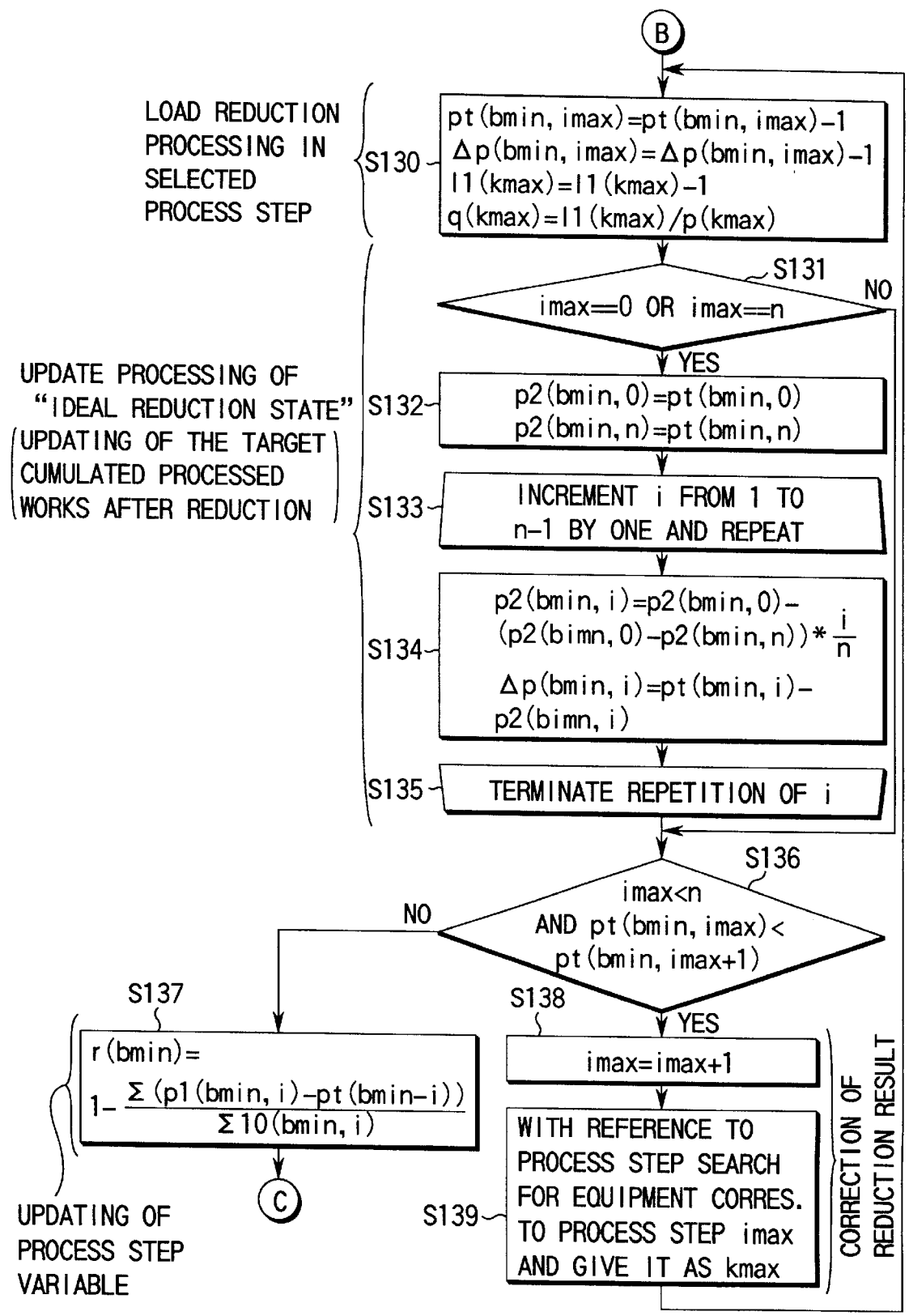
FIG. 35 is a flow chart showing a third part of the processing procedure of the excess load reduction section in FIG. 29.

Further explanation will be given below in more detail with reference to the flow chart shown in FIG. 34.

step S119: the greatest one of those excess loads, that is, the greatest equipment of the equipment load percentage q(k), is selected and given as kmas. If there exist a plurality of candidates, the value of the number k attached to the respective equipment selects the smallest equipment.

step S120: With reference to the process step/equipment table as shown in FIG. 8, selection is made of a product of the smallest reduction percentage r(b) from the products containing the equipment kmax. If there exist a plurality of candidates, selection is made of the product of the smallest one of the numbers attached to the respective products.

step S121: the numbers starting from [0] are attached, in a processing order, to the respective process steps in the process flow of the product bmin selected so as to reduce the load. And the number attached to the "output" process step is substituted into a variable n (bmin).

step S122: checking is made to see whether or not the reduced target cumulated processed works pt (bmin, 0) and reduced target cumulated processed works pt (bmin, n) coincide with each other. If there is a coincidence, the process goes to step S128. And if there is no coincidence the process goes to step S123.

step S128: the final "output" process step number n is substituted into a variable imax and the process goes to step S130 (FIG. 35).

step S123: with reference to the process step/equipment table as shown in FIG. 8, comparison is made between the current state and an ideal reduction state along the reduction policy, that is, a process step of the greatest variable $\Delta p$ (bmin, i) from a difference between the target of the reduced target cumulated processed works from the process steps of the product bmin involving the equipment kmax and the reduced target cumulated processed works, and selection is made of a process step of the smallest reduction load. And this selected process step is given as imax. If there exist a plurality of candidates, selection is made of a process step of the smallest number.

step S124: checking is made to see whether or not a difference $\Delta p$ (bmin, imax)<0 between the target of the reduced target cumulated processed works of the selected process steps of the selected product and the reduced target cumulated processed works. If this relation is established, the process goes to step S125 and if such relation is not established then the process goes to step S130 (FIG. 35).

step S125: [0] is substituted into imax.

step S126: the reduction policy of the product bmin is examined. In the case of the step "remaining item" preference the process goes to step S127 and in the case of the "output" preference the process goes to step S130 (FIG. 35).

step S127: the reduced total number pt (bmin, n) of the final "output" process steps of the selected product is reduced by [1], the difference $\Delta p$ (bmin, n) between the target of the reduced target cumulated processed works of the selected final "output" process steps and the reduced target cumulated processed works is reduced by "1" and the equipment load I1 (kmax) of the selected equipment is reduced by [1]. And the equipment load I1 (kmax)/ processing capability p (kmax) of the selected equipment is substituted into an equipment load percentage q (kmax) representing a ratio between the processing capability of the selected equipment and the load of the respective equipment. That is, in the step "remaining item" preference, in order to uniformly reduce the number of works processed in the respective process steps, a predetermined quantity (here [1]) of load is reduced from a final process step of a selected product before a load is reduced from an actually selected process load. By doing so, the load reduced from the respective process step is uniformized in the load reduction processing including later-described processing at step S130.

step S130: the reduced target cumulated processed works pt (bmin, imax) in the selected process steps of the selected product is reduced by a predetermined quantity such as [1], the difference $\Delta p$ (bmin, imax) between the target cumulated processed works in the selected process step and the reduced target cumulated processed works is reduced by [1] and a selected equipment load I1 (kmax) is reduced by [1]. And I1 (kmax)/p(kmax) is substituted into an equipment load percentage q (kmax).

step S131: checking is made to see whether or not the selected process step imax is equal to [0] (that is, the selected process step is equal to a first process step) or the selected process step imax is equal to n (that is, the selected process step is equal to a final "output" process step). If either one of these relations is established, the process goes to step S132 and if neither of these relations are established, the process goes to step S136.

step S132: into the target p2 (bmin, 0) of the reduced target cumulated processed works in the first process step of the selected product the reduced target cumulated processed works pt (bmin, 0) is substituted and into the target p2 (bmin, n) of the reduced target cumulated processed works in the final process step of the selected product the reduced target cumulated processed works pt (bmin, n) is substituted.

steps S133 to S135: loop processing is done using the process step i as a loop variable. The initial value of i is given as [1] and incremented by [1] each time the loop is passed once. The loop is terminated at "i=n−1" times.

step S134: p2 (bmin, 0)–p2 (bmin, 0)–p2 (bmin, n)×(i/n) is substituted into the reduced target cumulated processed works in the process step number i of the selected process step. And pt (bmin, i)–p2 (bmin, i) is substituted into the difference $\Delta p$ between the target cumulated processed works in the process number i of the selected process step and the reduced target cumulated processed works.

step S136: checking is made to see both whether or not the selected process step is not the final process step (imax<n) and whether or not the reduced target cumulated processed works of selected process steps of the selected product is smaller than the reduced target cumulated processed works of the process steps immediately downstream of the selected process step, that is, pt (bmin, imax)<pt (bmin, imax+1).

That is, detection is made to see whether, as a result of reducing the load, there occurs the case where the current cumulated processed works line becomes an actually improbable right-side-up line. If this is so, the process goes to step S138and correction processing is done to effect correction to an ideal reduction state (the target of the reduced target cumulated processed works). If this is not so, the process goes to step S137.

step S138: in order to reduce the load, the selected process step number imax is incremented by [1].

step S139: with reference to the process step/equipment table a search is made for an equipment corresponding to an updated imax and that equipment is given as an equipment number kmax for reducing the load. And the process is returned back to step S130.

step S137: in order to reduce the load, the following equation (1) is substituted into the product reduction percentage r (bmin) of the selected product.

$$1 - \frac{\sum_{i=0}^{n}(p1(bmin, i) - pt(bmin, i))}{\sum_{i=0}^{n} l0(bmin, i)} \quad (1)$$

and the process is returned back to step S111.

Figure 33:
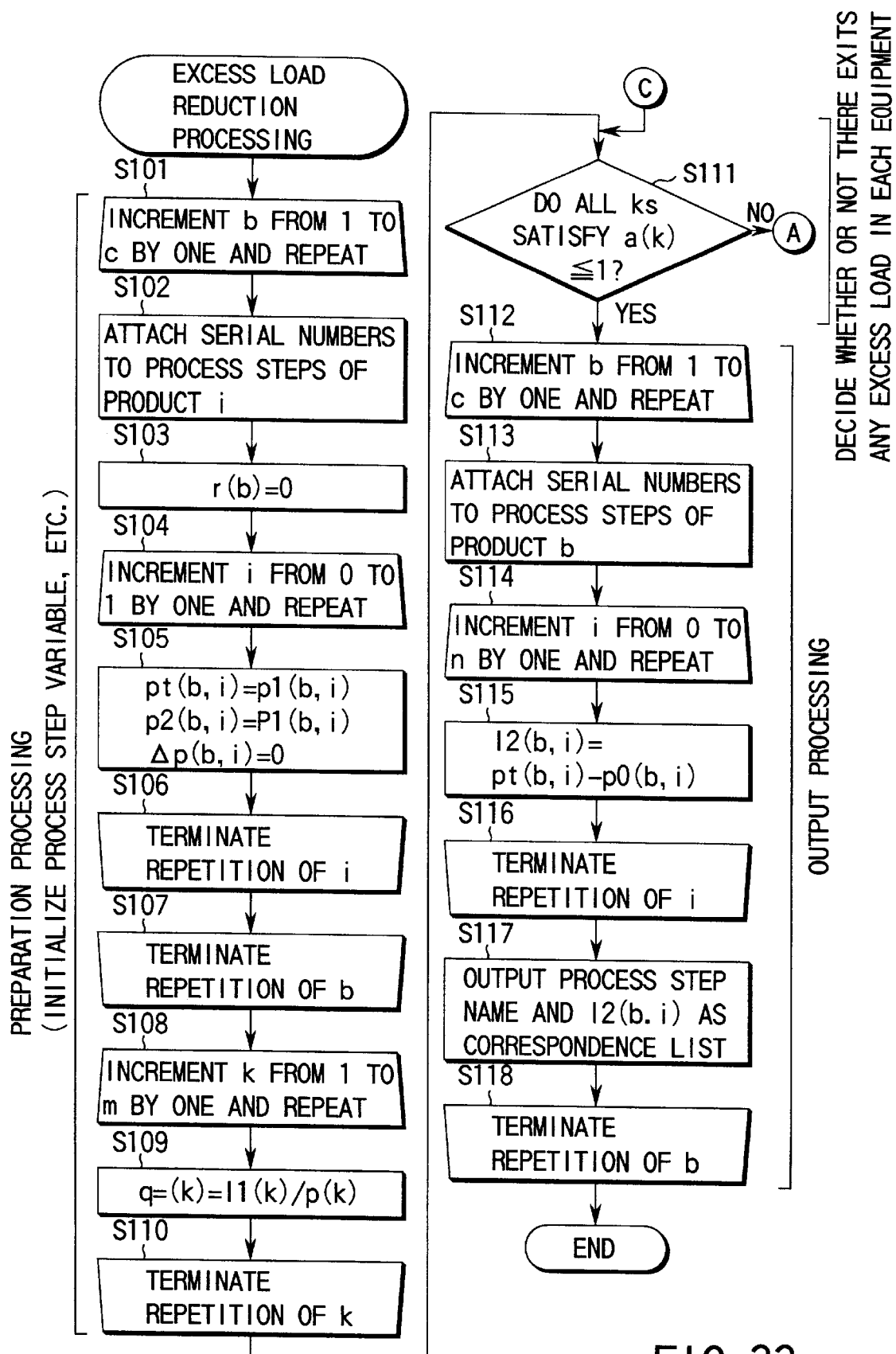
FIG. 33 is a flow chart showing a first part of a processing procedure of an excess load reduction in an excess load reduction section in FIG. 29.
Figure 34:
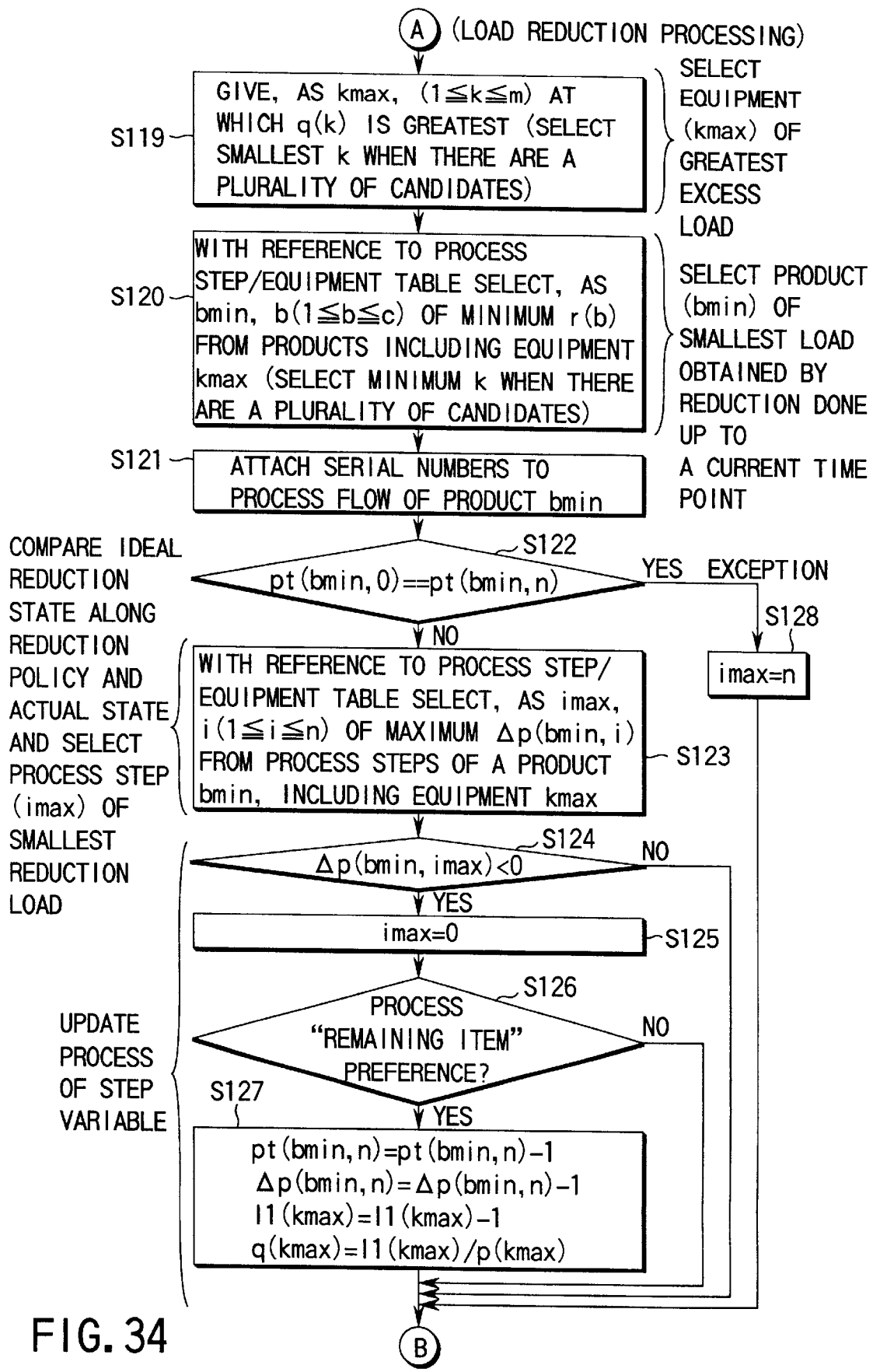
FIG. 34 is a flow chart of a second part of the processing procedure of the excess load reduction in the excess load reduction section in FIG. 29.

FIGS. 37A to 37C show the transition of variables in the repetition process of the load reduction processing done a predetermined number of times in accordance with a flow chart shown in FIGS. 33 to 35.

As set out above, according to the third embodiment, the reduction of a capability exceeding load can be accomplished along the reduction policy designated to the respective product. For the respective products, therefore, greater emphasis is placed on the "output" target than on the step "remaining item" preference or selection can be made the other way around. It is, therefore, possible to, after a finer adjustment, search for a practicable production planning within a capacity of a load involved.

According to the first to third embodiments, as set out above, it is possible to find, for a predecycle timeined time period (for example, one month), the current cumulated processed works of the respective process steps and the load (respective equipment load) for each processing equipment or to reduce a load, exceeding an equipment processing capability, in accordance with a designated reduction policy and draw up a work processing plan (for example, the respective process step load) in the process steps within the equipment processing capability. It is, therefore, possible to, without involving any hindrance to the production even if a demand quantity of production at and after the planned time varies due to a demand change, reduce the load exceeding the equipment processing capability to an extent to which the stock number of works in the respective process steps is made a minimal level required and, for the purpose of achieving this, to find the current cumulated processed works of works in the respective process steps at the end of a planned period. It is, thus, possible to set the target of a standby work allocation to be defined at the end of the planned time period.

The production planning method as set out in conjunction with the above-mentioned embodiment can be stored, as a computer-executable program, in a magnetic disk such as a floppy disk and hard disk, in an optical disk such as a CD-ROM and DVD, and in a semiconductor memory and so forth and be distributed in these formats.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A production planning method for making a production plan in a production line for producing finished products from a raw material, a raw material-to-finished product production process being divided into a plurality of process steps, a plurality of equipments being arranged at the production line, and at least one of the equipments participating in a least two of the process steps, the method comprising:

calculating the number of works processed in the respective process steps up to a planning time as current cumulated processed works of the respective process steps based on a stock number of works in respective process steps at the planning time;

calculating a target of the stock number of works in the respective process steps at a planned time following a passage of a plan period on the basis of a target production representing the number of finished products outputted up to the planned time and an average cycle time of production from the raw material to the finished products;

calculating target cumulated processed works of the respective process steps at the planned time based on the target of the stock number of the works in the respective process steps;

calculating the number of works necessary to be processed at the respective process steps during a period from the planning time to the planned time, as a process step load, based on the current cumulated processed works at the planning time and the target cumulated processed works up to the planned time;

calculating the number of works processed by the respective equipments during a period from the planning time to the planned time, as an equipment load of the respective equipment, based on the process step load of the respective process steps and a correspondence relation between the equipments and the process steps;

selecting equipments having equipment loads which exceed equipment processing capabilities; and reducing the process step load of the respective process steps based on an excess load of the selected equipment, wherein the further upstream the process steps, the greater a quantity of reduction of the process load so as to achieve target production.

2. A memory storing a computer-executable program code, a production plan being made by the program code in a production line for producing finished products from a raw material, a raw material-to-finished product production process being divided into a plurality of process steps, a plurality of equipments being arranged at the production line, and at least one of the equipments participating in at least two of the process steps, the program code comprising:

means for causing a computer to, based on a stock number of works in respective process steps at a planning time, calculate the number of works processed in the respective process steps up to the planning time as current cumulated processed works of the respective process steps;

means for causing the computer to calculate a target of a stock number of works in the respective process steps at a planned time following a passage of a plan period on the basis of a target production representing the number of finished products outputted up to the planned time and an average cycle time of production from the raw material to the finished products;

means for causing the computer to, based on the target of the stock number of the works in the respective process steps, calculate target cumulated processed works of respective process steps at the planned time; and means for causing the computer to, based on the current cumulated processed works of the respective process steps at the planning time and the target cumulated processed works of the respective process step up to the planned time, calculate as a process step load of the respective process steps the number of works necessary to be processed at the respective process steps during a period from the planning time to the planned time;

means for causing the computer to, based on the process step load of the respective process steps and a correspondence relation between the equipment and the process steps, calculate the number of work processed by the respective equipments during a period from the planning time to the planned time as an equipment load of the respective equipment;

means for causing the computer to select equipments having equipment loads which exceed equipment processing capabilities; and means for causing the computer to reduce the process step load of the respective process steps based on an excess load of the selected equipment, wherein the further upstream the process steps, the greater a quantity of reduction of the process load so as to achieve target production.

3. A production planning apparatus for making a production plan in a production line for producing finished products from a raw material, a raw material-to-finished product production process being divided into a plurality of process steps, a plurality of equipments being arranged at the production line, and at least one of the equipments participating in at least two of the process steps, the apparatus comprising:

means for calculating, based on a stock number of works in respective process steps at a planning time, the number of works processed in the respective process steps up to the planning time as current cumulated processed works of the respective process step;

means for calculating a target of a stock number of works in the process steps at a planned time following a passage of a plan period on the basis of a target production representing the number of finished products outputted up to the planned time and an average cycle time of production from the raw material to the finished products;

means for calculating, based on the target of the stock number of works in the respective process steps, target cumulated processed works of respective process steps at the planned time; and means for calculating, based on current cumulated processed works of the respective process steps at the planning time and the target cumulated processed works of the respective process steps at a planned time, the number of works necessary to be processed at the respective process steps during a period from the planning time to the planned time as a process step load of the respective process steps;

means for calculating, based on the process step load of the respective process steps and a correspondence relation between the equipment and the process steps, the number of works processed by the respective equipments during a period from the planning time to the planned time as an equipment load of the respective equipment;

means for selecting equipments having equipment loads which exceed equipment processing capabilities; and means for reducing the process step load of the respective process steps based on an excess load of the selected equipment, wherein in order to achieve target production, the further upstream the process steps, the greater a quantity of reduction of the process load.

4. A production planning method for making a production plan in a production line for producing finished products from a raw material through a plurality of process steps, the method comprising steps of:

calculating the number of current cumulated processed works of each of the process steps on the basis of a stock number of works at each of the process steps, said number of current cumulated processed works of one process step being a total number of the stock numbers of works of said one process step and its upstream process steps;

setting the number of target cumulated processed works of each of the process steps by adding a load to the number of current cumulated processed works of the corresponding one of the process steps;

determining a process step at which the number of target cumulated processed works exceeds processing capability;

reducing the number of target cumulated processed works of the determined process step; and reducing the number of target cumulated processed works of each of the process steps which are downstream from the determined process step, such that the number of target cumulated processed works of said each of the process steps does not exceed the number of target cumulated processed works of a preceding one of the process steps which is upstream from said each process step.

\* \* \* \* \*